US010801392B2

(12) United States Patent
Dudar

(10) Patent No.: US 10,801,392 B2
(45) Date of Patent: Oct. 13, 2020

(54) SYSTEMS AND METHODS FOR EXPEDITED VEHICLE SOAK

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 105 days.

(21) Appl. No.: 15/990,222

(22) Filed: May 25, 2018

(65) Prior Publication Data

US 2019/0360380 A1  Nov. 28, 2019

(51) Int. Cl.
*F01P 7/14* (2006.01)
*F01P 3/00* (2006.01)
*B60K 11/02* (2006.01)
*B60K 11/08* (2006.01)
*G07C 5/08* (2006.01)

(52) U.S. Cl.
CPC ............. *F01P 7/14* (2013.01); *B60K 11/02* (2013.01); *B60K 11/085* (2013.01); *F01P 3/00* (2013.01); *G07C 5/0808* (2013.01); *F01P 2003/001* (2013.01); *F01P 2025/08* (2013.01); *F01P 2025/60* (2013.01); *F01P 2037/00* (2013.01); *Y10S 903/903* (2013.01)

(58) Field of Classification Search
CPC ...... F01P 5/02; F01P 5/043; F01P 5/06; F01P 7/02; F01P 7/026; F01P 7/06; F01P 2031/30; B60K 11/08; B60K 11/085
USPC ........................ 180/68.1; 123/41.12, 41.05
See application file for complete search history.

(56) References Cited

U.S. PATENT DOCUMENTS 2,812,027 A * 11/1957 Swan ............... F01P 5/043
416/163
4,327,674 A *  5/1982 Takei .............. F01P 5/043
123/41.12

(Continued)

FOREIGN PATENT DOCUMENTS

EP   0875631 A1 * 11/1998 .......... E02F 9/226
JP   03104792 A  *  5/1991 .......... F02B 61/02
JP   08004528 A  *  1/1996 .......... F01P 5/043

OTHER PUBLICATIONS

JP-08004528-A English translation of Abstract from EAST (Year: 2020).*

(Continued)

*Primary Examiner* — Jacob M Amick
*Assistant Examiner* — Michael A Kessler
(74) *Attorney, Agent, or Firm* — Geoffrey Brumbaugh; McCoy Russell LLP

(57) ABSTRACT

Methods and systems are provided for rapidly cooling an engine system of a vehicle at vehicle-off events. In one example, a method may include cooling the engine system via selecting whether to rotate a cooling fan in a first direction or a second direction based on an indication of whether temperature of the engine system decays at a faster rate under conditions where the cooling fan is rotated in the first direction as compared to the second direction, or vice versa. In this way, diagnostics that rely on static, low-noise conditions may be conducted for vehicle-off conditions that are not sufficiently long to allow for sufficient engine system cooling in a timeframe of the vehicle-off condition.

17 Claims, 13 Drawing Sheets

(56) References Cited

U.S. PATENT DOCUMENTS

| | | | | |
|---|---|---|---|---|
| 4,930,460 | A * | 6/1990 | Aihara | B60K 11/00 |
| | | | | 123/41.31 |
| 5,609,125 | A * | 3/1997 | Ninomiya | F01P 7/08 |
| | | | | 123/41.12 |
| 6,076,488 | A * | 6/2000 | Yamagishi | F01P 5/043 |
| | | | | 123/41.12 |
| 7,066,114 | B1 | 6/2006 | Hannesen et al. | |
| 7,121,368 | B2 | 10/2006 | MacKelvie | |
| 9,050,885 | B1 | 6/2015 | Dudar et al. | |
| 9,140,627 | B2 | 9/2015 | Dudar et al. | |
| 9,512,791 | B1 | 12/2016 | Dudar et al. | |
| 2017/0002719 | A1 | 1/2017 | Dudar | |
| 2019/0211739 | A1* | 7/2019 | Maeda | F01P 7/04 |
| 2019/0272687 | A1* | 9/2019 | Dudar | F01P 5/043 |

OTHER PUBLICATIONS

"Cleanfix: Reversible Fans for Radiator Cleaning," Cleanfix Website, Available Online at https://cleanfix.org/en, Available as Early as Nov. 13, 2017, 5 pages.

* cited by examiner

SYSTEMS AND METHODS FOR EXPEDITED VEHICLE SOAK

FIELD

The present description relates generally to methods and systems for reducing an amount of time to cool a vehicle engine system in order to conduct onboard diagnostic procedures.

BACKGROUND/SUMMARY

Autonomous vehicles assume certain vehicle tasks otherwise handled by a traditional vehicle driver. Autonomous vehicles can navigate to a specific destination by controlling the steering, acceleration, braking, etc., by relying on sensors or other resources to detect nearby vehicles, pedestrians, and objects in or near the road. The autonomous vehicle is controlled according to the signals output by such sensors.

Future autonomous vehicles are envisioned as participating in car sharing or ride sharing models. Accordingly, future vehicles are projected to accumulate upwards of 250,000 miles in three years when included in such car sharing models. In such examples, vehicle rest time where the vehicle is not in operation may be limited. Such circumstances may be problematic for onboard diagnostics for the reason that it is desirable to perform certain onboard diagnostics in a noise-free static environment hours (e.g. 6-8 hours) after the vehicle is shut down. The time after vehicle shut down prior to conducting such diagnostics is referred to as a "soak" time, which allows for the engine to cool down and fuel temperature to stabilize. Conducting diagnostics under such conditions may lead to more robust and accurate results of onboard diagnostic tests. While such methodology is efficient for vehicles that do not participate in car sharing models, lack of adequate soak time for autonomous vehicles that participate, in car sharing may result in low completion rates or inaccurate results, if the diagnostics were to be conducted prior to attaining the noise-free static environment. Accordingly systems and methods for expediting vehicle soak time, is desired.

The inventors have herein recognized the above-mentioned issues, and have developed systems and methods to at least partially address them. In one example, a method comprises cooling an engine system of a vehicle at a vehicle-off event via selecting whether to rotate a cooling fan in a first direction or a second direction based on an indication of whether an engine system temperature decay rate is faster under conditions where the cooling fan is rotated in the first direction as compared to the second direction, or vice versa, and conducting a diagnostic in response to the cooling. In this way, engine systems for vehicles that participate in car-sharing models may be rapidly cooled at vehicle-off events, such that diagnostics that rely on low noise, static conditions may be conducted prior to the vehicle again being in operation.

As examples, the indication of whether an engine system temperature decay rate is faster under conditions where the cooling fan is rotated in the first direction as compared to the second direction, or vice versa, may be based at least in part on learned information regarding the vehicle-off event, at least in part on one or more parking conditions at the vehicle-off event, at least in part on vehicle-to-vehicle communications at the vehicle-off event, and/or at least in part on a first engine coolant temperature decay rate and a second engine coolant temperature decay rate.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
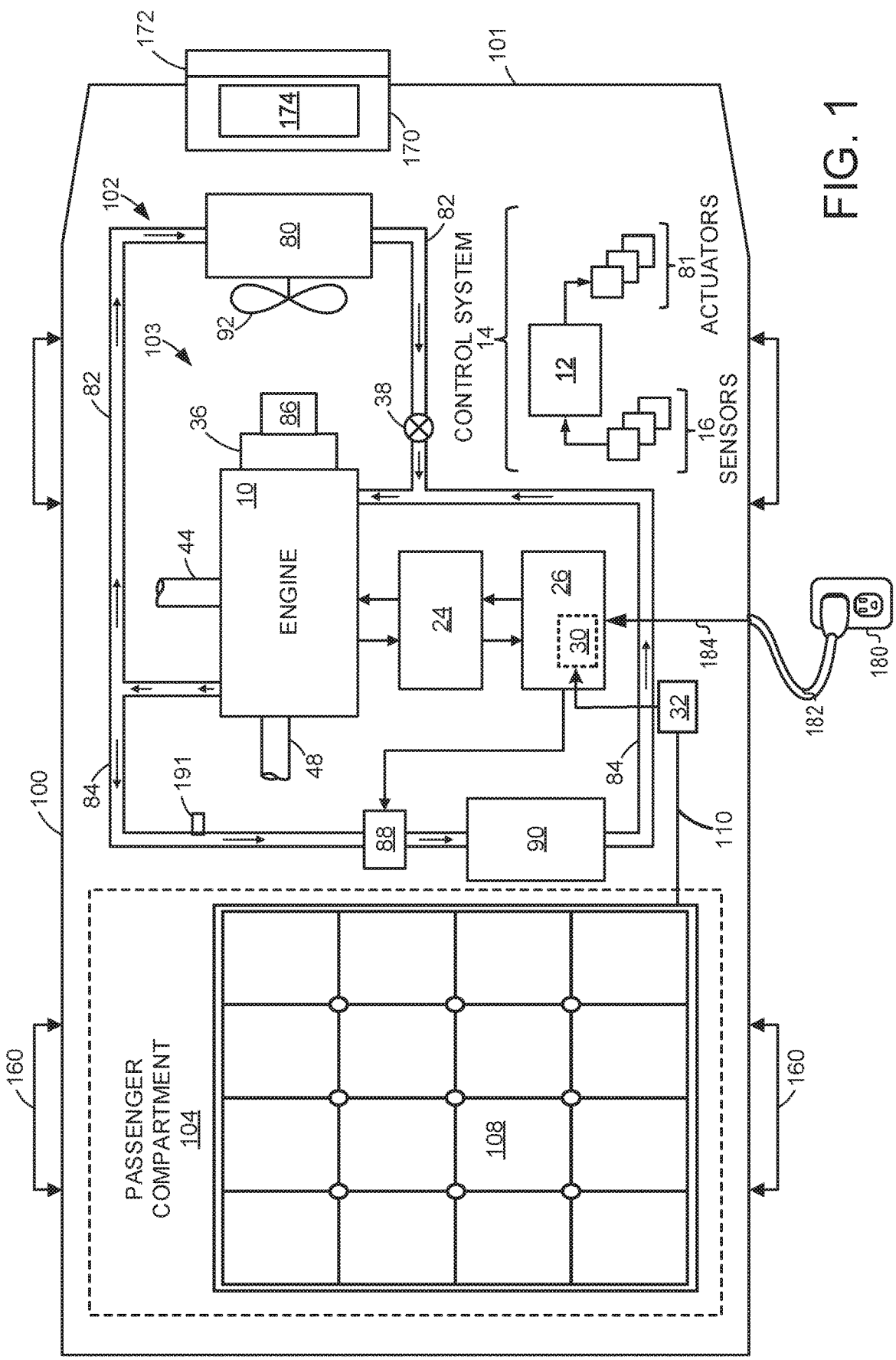
FIG. 1 shows a schematic depiction of a cooling system for a hybrid vehicle system.
Figure 2:
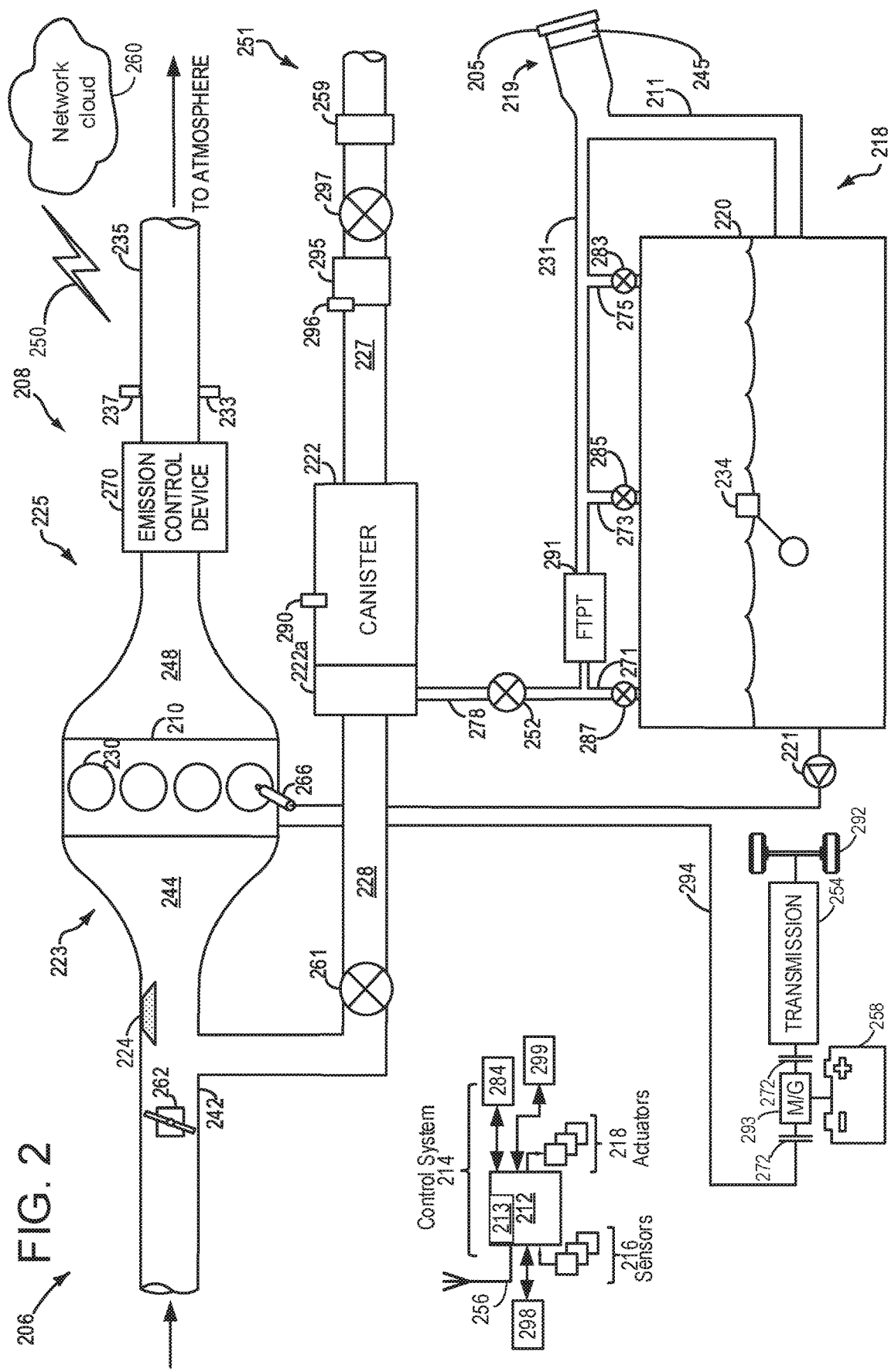
FIG. 2 shows a schematic depiction of a fuel system and evaporative emissions system coupled to an engine system.

The following description relates to systems and methods for rapidly cooling an engine system of a vehicle at a vehicle-off event. Rapidly cooling the engine system may include operating a cooling fan in one of a first direction or a second direction, depending on what direction results in the fastest rate of engine system temperature decay. Accordingly, a vehicle system including a cooling fan and cooling system, is depicted at FIG. 1. Such an approach may enable diagnostics to be conducted that rely on static, low-noise conditions, including diagnostics to indicate a presence or absence of undesired evaporative emissions stemming from a vehicle evaporative emissions system and/or fuel system, such as depicted at FIG. 2. Rotating the cooling fan in the first direction or the second direction may be enabled via use of an H-bridge circuit, such as the H-bridge circuit depicted at FIGS. 3A-3B. In one example, solar power may be utilized to power the cooling fan operation at the vehicle-off events, via the circuitry schematically depicted at FIG. 4.

Figure 5:
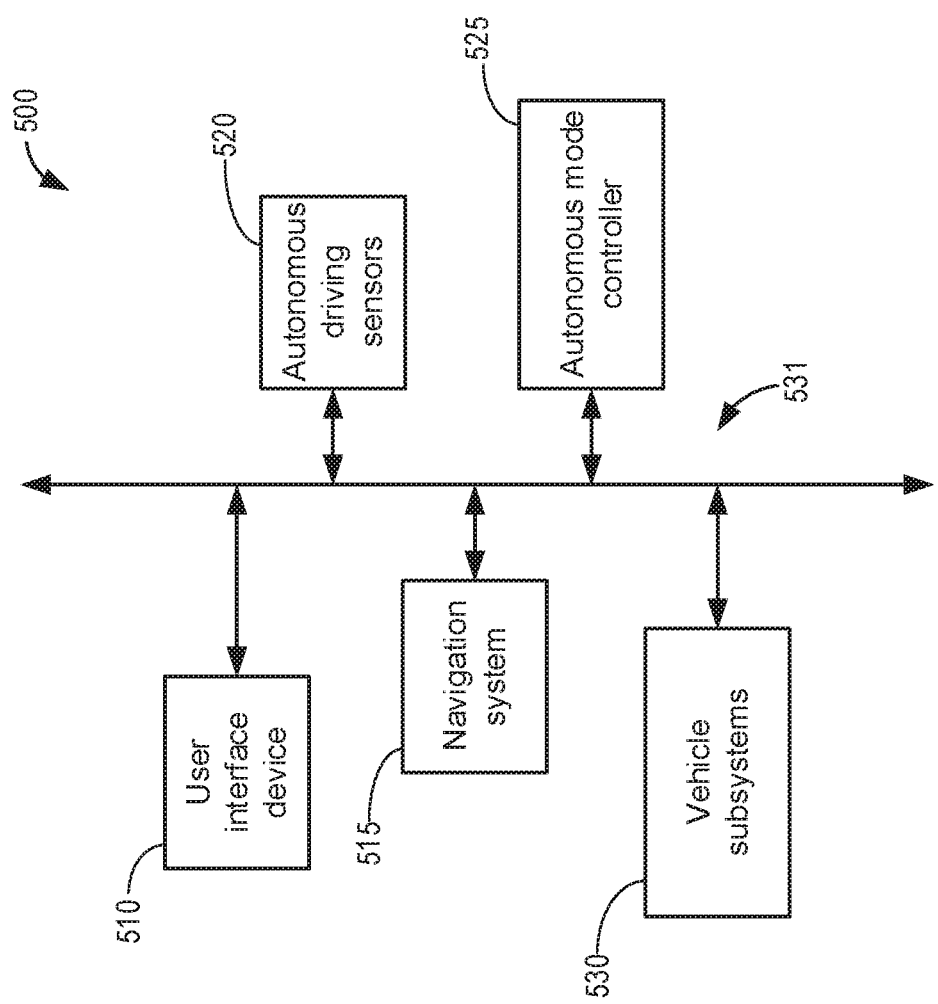
FIG. 5 schematically illustrates a block diagram of an example autonomous driving system.
Figure 6:
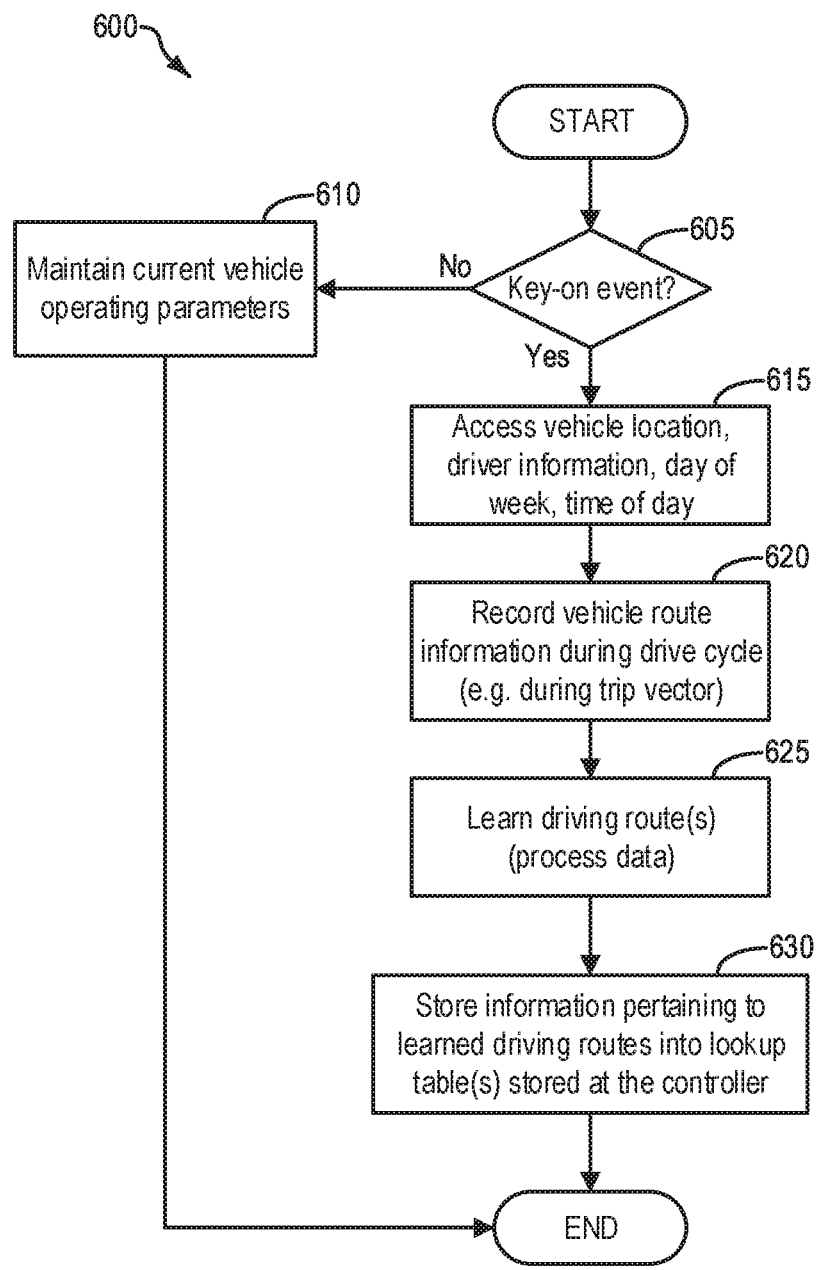
FIG. 6 shows a high level flowchart for an example method for machine learning of common driving routes.
Figure 9:
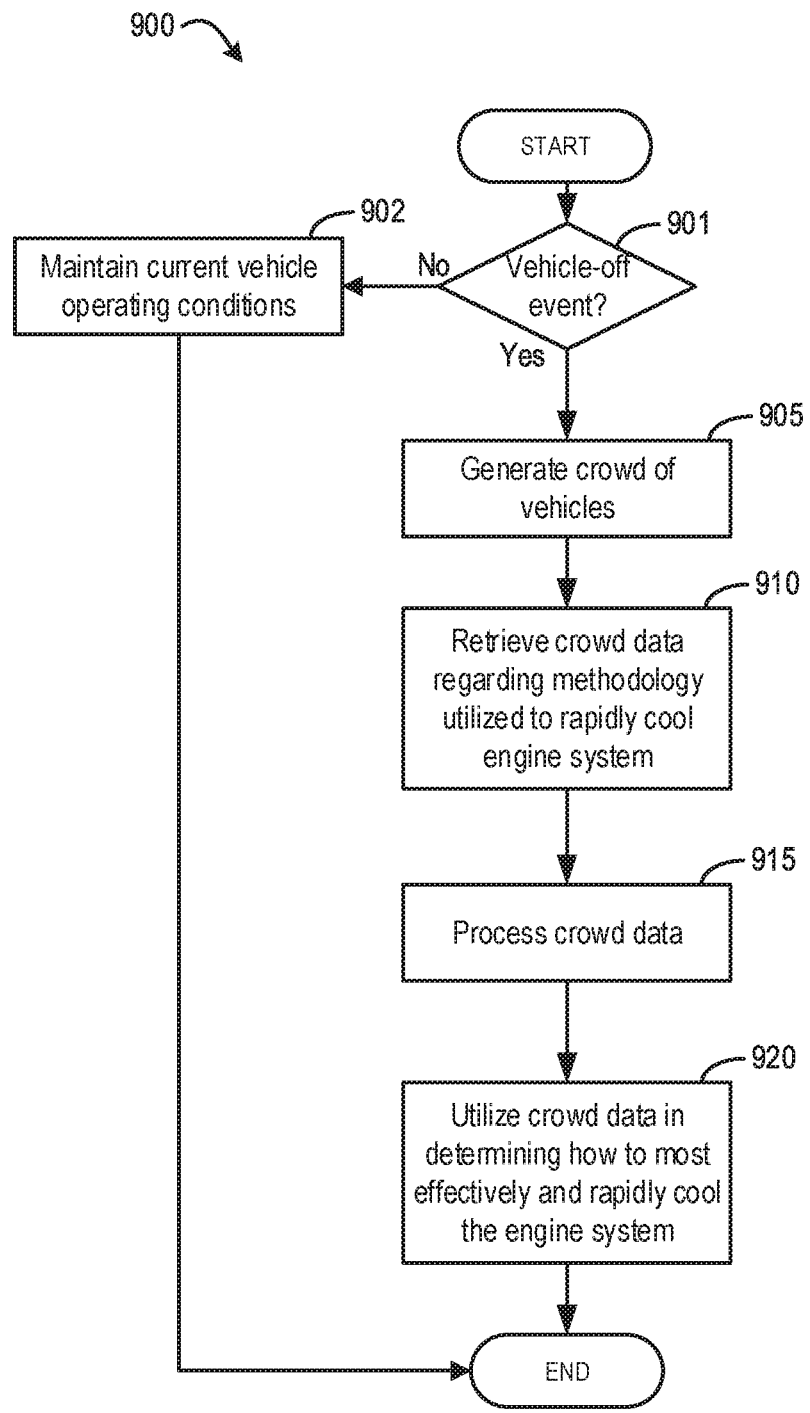
FIG. 9 depicts a high-level flowchart for using V2V/V2I2V communications to indicate whether it is likely that rotating a cooling fan in one direction will result in a faster rate of engine cooling than rotation in the opposite direction.
Figure 10:
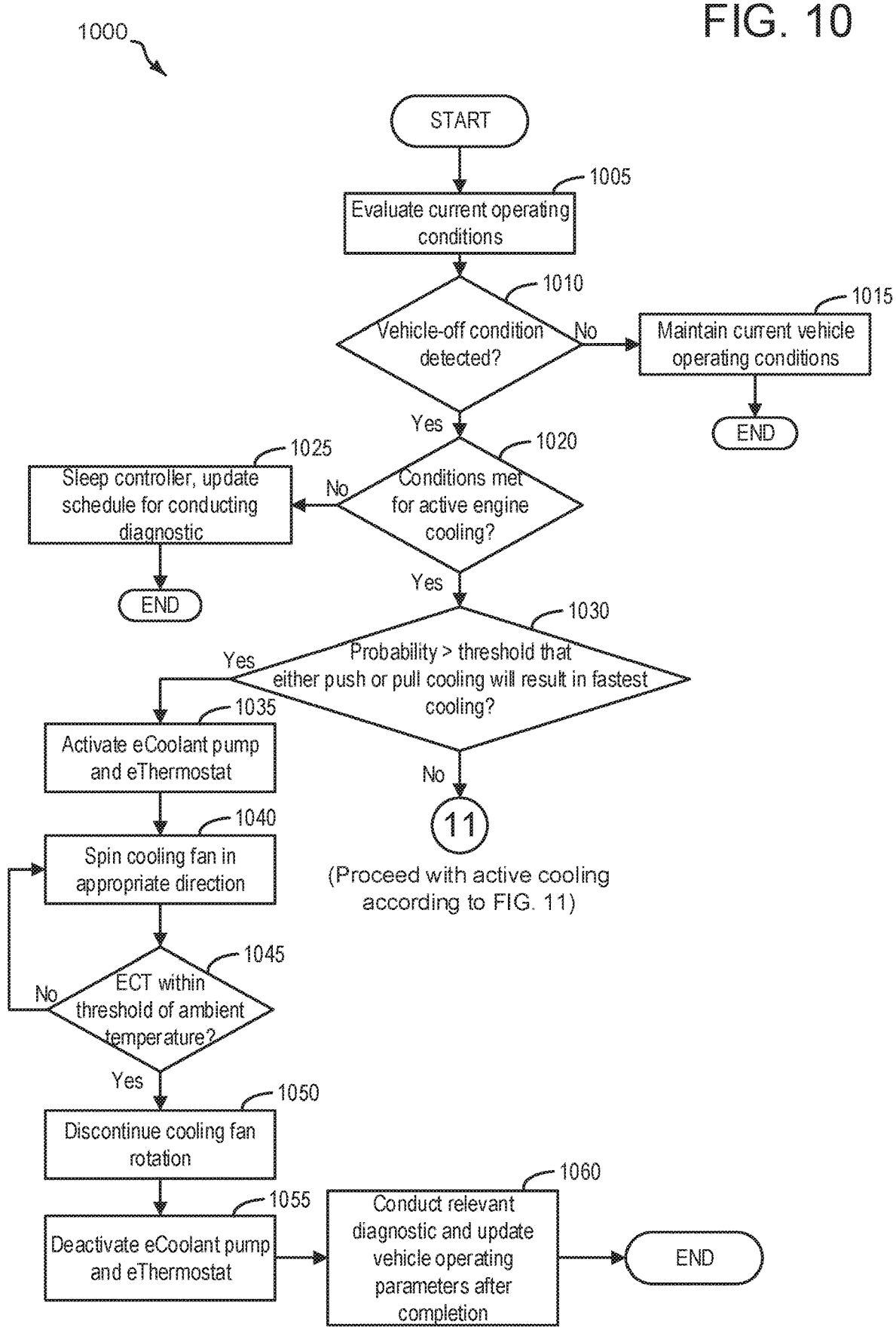
FIG. 10 depicts a high level flowchart for predicting whether it is likely that rotating a cooling fan in one direction will result in a faster rate of engine cooling than rotation in the opposite direction, and cooling the engine via the appropriate method.

The rapid cooling of the engine system may be useful for vehicles participating in car-sharing models, such as autonomously operated vehicles. Accordingly, an autonomous vehicle system is depicted at FIG. 5. Selecting whether to cool the engine system via rotating the cooling fan in the first direction or the second direction may be based at least in part on learned information comprising particular vehicle-off events, where such learned information may be acquired via the method depicted at FIG. 6. In some examples, rapid engine cooling may be requested at particular times of day, whereas at other times of day rapid engine cooling may be conducted via a natural cooling effect of a diurnal cycle, such as the diurnal cycle depicted at FIG. 7. Selecting whether to cool the engine system via rotating the cooling fan in the first direction or the second direction may be based at least in part on parking conditions at the vehicle-off event, such as the parking conditions depicted at FIGS. 8A-8B. Selecting whether to cool the engine system via rotating the cooling fan in the first direction or the second direction may be based at least in part on vehicle-to-vehicle communication at the vehicle-off event, via the methodology depicted at FIG. 9. FIG. 10 depicts an example method for indicating whether a probability is greater than a threshold that the engine system may be most rapidly cooled via rotating the cooling fan in the first direction as compared to the second condition, or vice versa. If the probability is not greater than the threshold, the method depicted at FIG. 11 may be used to determine which direction of cooling fan rotation results in the fastest or greatest rate of engine system cooling. In some examples, FIG. 10 may include two extra steps, depicted at FIG. 12. An example timeline for rapidly cooling an engine system at a vehicle-off event is depicted at FIG. 13.

Turning now to FIG. 1, an example embodiment of a motor vehicle system 100 comprising an internal combustion engine 10 and a cooling system 102 is illustrated schematically. Internal combustion engine 10 includes an intake 44 and an exhaust 48. Cooling system 102 circulates coolant through internal combustion engine 10 to absorb waste heat and distributes the heated coolant to radiator 80 and/or heater core 90 via coolant lines 82 and 84, respectively.

In particular, FIG. 1 shows cooling system 102 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 36, and rotated proportionally to engine speed via belt, chain, etc. Specifically, engine-driven pump 86 circulates coolant through passages in the engine block, head, etc., to absorb engine heat, which is then transferred via the radiator 80 to ambient air. In an example where pump 86 is a centrifugal pump, the pressure (and resulting flow) produced may be proportional to the crankshaft speed, which in the example of FIG. 1, is directly proportional to engine speed. The temperature of the coolant may be regulated by a thermostat valve 38, also referred to herein as thermostat 38, located in the cooling line 82, which may be kept closed until the coolant reaches a threshold temperature. In some examples, thermostat 38 may comprise an electronically actuated thermostat. The temperature of the coolant may be measured via an engine coolant temperature sensor 191.

Further, cooling fan 92 may be coupled to radiator 80 in order to maintain an airflow through radiator 80 when vehicle 100 is moving slowly or stopped while the engine is running. In some examples, fan speed may be controlled by controller 12. In other words, the cooling fan 92 may be electronically actuated. Alternatively, fan 92 may be coupled to engine-driven water pump 86. One or more additional cooling fans may be coupled within the engine compartment, and configured to direct air at and/or through heat-generating elements within the engine compartment 103. Cooling fan 92 may be configured to be reversible. For example, when cooling fan 92 is rotated in a first direction, airflow may be drawn or pulled from atmosphere to the engine compartment 103. Alternatively, when cooling fan 92 is rotated in a second direction, airflow may be pushed from engine compartment 103 to atmosphere. Discussed herein, when cooling fan 92 is rotated in the first direction, air flow drawn into the engine compartment is referred to as "pull cooling." Alternatively, when cooling fan 92 is rotated in the second direction, air flow pushed from the engine compartment to atmosphere is referred to as "push cooling." Said another way, when the cooling fan is operated in the first direction, air is directed via the cooling fan at the engine compartment, whereas when the cooling fan is operated in the second direction, air is directed at the radiator 80. Said still another way, operating the cooling fan in the first direction includes a typical direction of rotation the cooling fan is rotated in while the engine is combusting air and fuel. Rotation in the second direction comprises the reverse direction. An H-bridge circuit (see FIGS. 3A-3B) may be used for reversing rotation of the cooling fan. Discussed herein, rotating the cooling fan in the first direction may comprise rotating the cooling fan in a forward direction, whereas rotating the cooling fan in the second direction may comprise rotating the cooling fan in a reverse direction.

It may be understood that rotating the cooling fan in the second direction may serve to at least partially remove dust and/or debris from the radiator 80. Such cleaning of the radiator may be particularly desirable for vehicles participating in car-sharing models, where such vehicles may accumulate a large number of miles in a short period of time.

After passing through engine 10, coolant may flow through coolant line 82, as described above, and/or through coolant line 84 to heater core 90 where the heat may be transferred to passenger compartment 104, and subsequently the coolant may flow back to engine 10. In some examples, engine-driven pump 86 may operate to circulate the coolant through both coolant lines 82 and 84. In examples where vehicle 100 has a hybrid-electric propulsion system, an electric auxiliary pump 88 may be included in the cooling system in addition to the engine-driven pump. As such, auxiliary pump 88 may be employed to circulate coolant through heater core 90 during occasions when engine 10 is off (e.g., electric only operation) and/or to assist engine-driven pump 86 when the engine is running. Like engine-driven pump 86, auxiliary pump 88 may be a centrifugal pump; however, the pressure (and resulting flow) produced by pump 88 may be proportional to an amount of power supplied to the pump by energy storage device (ESD) 26.

Motor vehicle 100 may further include a grill 172 providing an opening (e.g., a grill opening, a bumper opening, etc.) for receiving air flow through or near the front end 101 of the vehicle and into the engine compartment. Such air flow may then be utilized by radiator 80 and other components to keep the engine and/or transmission cool. Further, the air flow may reject heat from the vehicle air conditioning and can improve performance of turbo charged/super charged engines that are equipped with intercoolers that reduce the temperature of the air that goes into the intake manifold/engine. Other under hood components (fuel system, batteries, fuel vapor canister, etc.) may benefit from the cooling air flow as well. Thus, grill shutter system 170 may assist cooling system 102 in cooling internal combustion engine 10. Grill shutter system 170 comprises one or more grill shutters 174 configured to adjust the amount of air flow received through grill 172.

Grill shutters 174 are operable between an opened position and a closed position, and may be maintained at either position or a plurality of intermediate positions thereof. In other words, opening of grill shutters 174 may be adjusted such that grill shutters 174 are opened partially, closed partially, or cycled between an opened position and a closed position to provide air flow for cooling engine compartment components at the least loss in fuel economy. This is because closing and/or partially closing grill shutters 174 reduces an amount of air flow received through grill 172, thus reducing the aerodynamic drag on the vehicle.

In some embodiments, control system 14 may be configured to adjust opening of grill shutters 174. Adjusting opening of grill shutters 174 may include opening one or more of the grill shutters, closing one or more of the grill shutters, partially opening one or more of the grill shutters, partially closing one or more of the grill shutters, adjusting opening and closing timing, etc. As an example, controller 12 may be communicably connected to grill shutter system 170, and may have instructions stored thereon to adjust opening of grill shutters 174.

Further, grill shutter system 170 may be adjusted during a non-driven vehicle condition. Thus, adjusting opening of one or more of the grill shutters 174 can be in response to a non-driven vehicle condition. The non-driven vehicle condition may be a deceleration condition, a braking condition, a tip-out condition, a combination thereof, or another type of condition signaling that a non-driven vehicle condition is occurring, or about to occur. For example, an automatic cruise control braking signal may also be used. Further still, global positioning signals may be used indicating a slower region ahead, a downgrade approaching, etc. In some examples, grill shutters 174 may be electronically actuated during key-off conditions.

In this example embodiment, the hybrid propulsion system includes an energy conversion device 24, which may include a motor, a generator, among others and combinations thereof. The energy conversion device 24 is further shown coupled to an energy storage device 26, which may include a battery, a capacitor, a flywheel, a pressure vessel, etc. The energy conversion device may be operated to absorb energy from vehicle motion and/or the engine and convert the absorbed energy to an energy form suitable for storage by the energy storage device (e.g., provide a generator operation). The energy conversion device may also be operated to supply an output (power, work, torque, speed, etc.) to the drive wheels 160, engine 10 (e.g., provide a motor operation), auxiliary pump 88, cooling fan 92, etc. It should be appreciated that the energy conversion device may, in some embodiments, include only a motor, only a generator, or both a motor and generator, among various other components used for providing the appropriate conversion of energy between the energy storage device and the vehicle drive wheels and/or engine.

Hybrid-electric propulsion embodiments may include full hybrid systems, in which the vehicle can run on just the engine, just the energy conversion device (e.g., motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. Additionally, the various components described above may be controlled by vehicle controller 12.

From the above, it should be understood that the exemplary hybrid-electric propulsion system is capable of various modes of operation. In a full hybrid implementation, for example, the propulsion system may operate using energy conversion device 24 (e.g., an electric motor) as the only torque source propelling the vehicle. This "electric only" mode of operation may be employed during braking, low speeds, while stopped at traffic lights, etc. In another mode, engine 10 is activated to combust air and fuel, and acts as the only torque source powering drive wheel 160. In still another mode, which may be referred to as an "assist" mode, the hybrid propulsion system may supplement and act in cooperation with the torque provided by engine 10. As indicated above, energy conversion device 24 may also operate in a generator mode, in which torque is absorbed from engine 10 and/or the transmission. Furthermore, energy conversion device 24 may act to augment or absorb torque during transitions of engine 10 between different combustion modes (e.g., during transitions between a spark ignition mode and a compression ignition mode).

Energy storage device 26 may periodically receive electrical energy from a power source 180 residing external to the vehicle (e.g. not part of the vehicle) as indicated by arrow 184. As a non-limiting example, vehicle system 100 may be configured as a plug-in hybrid electric vehicle (PHEV), whereby electrical energy may be supplied to energy storage device 26 from power source 180 via an electrical energy transmission cable 182. During a recharging operation of energy storage device 26 from power source 180, electrical transmission cable 182 may electrically couple energy storage device 26 and power source 180. While the vehicle propulsion system is operated to propel the vehicle, electrical transmission cable 182 may be disconnected between power source 180 and energy storage device 26. Control system 14 may identify and/or control the amount of electrical energy stored at the energy storage device, which may be referred to as the state of charge (SOC). Power source 180 may comprise a part of an electrical grid.

In other embodiments, electrical transmission cable 182 may be omitted, where electrical energy may be received wirelessly at energy storage device 26 from power source 180. For example, energy storage device 26 may receive electrical energy from power source 180 via one or more of electromagnetic induction, radio waves, and electromagnetic resonance. As such, it should be appreciated that any suitable approach may be used for recharging energy storage device 26 from a power source that does not comprise part of the vehicle. In this way, a motor may propel the vehicle by utilizing an energy source other than the fuel utilized by engine 10.

In some examples, vehicle system 100 may include one or more solar cells 108, operative to convert incident solar radiation into electrical energy. The solar cells 108 are electrically coupled to solar battery 30, via charge controller 32. Solar cells 108 and charge controller 32 are operative to supply electrical current for charging solar battery 30. In this example, solar battery 30 is housed within and electrically coupled to energy storage device 26, but in other configurations solar battery 30 may be electrically coupled to energy storage device 26 while being housed separately, or may be both physically and electrically isolated from energy storage device 26. Solar battery 30 may thus be configured to provide or receive charge from energy storage device 26, depending on engine operating conditions, charge status, and battery requirement(s). Solar battery 30 may be configured to independently supply charge directly to vehicle actuators and devices, such as cooling fan 92, auxiliary pump 88, thermostat valve 38 (which may comprise an electrically-actuatable valve) and grill shutter 174. In some examples, charge controller 32 may be used to directly supply power to vehicle actuators and devices without requiring charge to first be stored in solar battery 30. By directly coupling solar cells 108 to vehicle devices and actuators via charge controller 32 and/or solar battery 30, vehicle devices and actuators related to climate and temperature control may be activated responsive to sun-loading on the solar cells. For example, passenger cabin air conditioning may be activated, vehicle windows may be vented, smart-windows may be tinted or otherwise configured to block UV, IR, and/or visible light, etc. As described further herein and with reference to FIGS. 10-12, cooling fan 92, electric auxiliary pump 88, and thermostat valve 38 may be controlled during key-off conditions by relying on power derived from solar cells 108.

As shown in FIG. 1, the solar cells 108 may be mounted on any convenient exterior surface of the vehicle, for example a vehicle roof, hood, trunk, etc. However, solar cells 108 may additionally or alternatively be mounted on the interior of the vehicle, such as on a dashboard, or other passenger compartment surface in proximity to a window or interior light bulb. In general, the solar cells are operative to convert solar radiation incident thereon into electrical energy. In some embodiments, solar cells 108 may comprise a series of photovoltaic cells, formed from an amorphous semi-conductor material, such as silicon. Additionally, individual photovoltaic cells may be interconnected so as to provide a constant flow of electrical energy to a common output cable 110, which electrically couples solar cells 108 to charge controller 32 and solar battery 30.

For conducting the types of operations described above, as discussed, control system 14 may be utilized. Control system 14 may include a controller 12, which may receive information from various sensors 16, and may send signals to various actuators 81, such as those described above with reference to FIG. 1. The various actuators may comprise the grill shutters, the auxiliary pump, the cooling fan, etc.

FIG. 2 shows a schematic depiction of a vehicle system 206. Vehicle system 206 may be the same vehicle system as vehicle system 100 depicted at FIG. 1. The vehicle system 206 includes an engine system 208 coupled to an emissions control system 251 and a fuel system 218. Emission control system 251 includes a fuel vapor container or canister 222 which may be used to capture and store fuel vapors.

The engine system 208 may include an engine 210 (e.g. same as 10) having a plurality of cylinders 230. The engine 210 includes an engine intake 223 and an engine exhaust 225. The engine intake 223 includes a throttle 262 fluidly coupled to the engine intake manifold 244 (e.g. same as 44) via an intake passage 242. The engine exhaust 225 includes an exhaust manifold 248 (e.g. same as 48) leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a refueling system 219. In some examples, refueling system may include a fuel cap 205 for sealing off the refueling system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212 (e.g., same as 12), for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Fuel vapor adsorbing to the canister adsorbent bed is typically an exothermic reaction (heat is released). Similarly, fuel vapor desorbing from the canister adsorbent bed is typically an endothermic reaction (heat is absorbed). As such, one or more temperature sensors 290 may be coupled to canister 222 (and/or buffer 222a). Temperature sensor 290 may be used, for example, to monitor the canister temperature during refueling operations, so as to infer canister load, and may be further used, for example, to monitor the canister temperature during purging operations, so as to infer fuel charge entering the engine intake.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve (CVV) 297 coupled within vent line 227. When included, canister vent valve 297 may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 (e.g. same as 12) in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent line 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Canister vent valve 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be a normally open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced.

Controller 212 may comprise a portion of a control system 214 (e.g. same as 14). Control system 214 is shown receiving information from a plurality of sensors 216 (e.g. same as 16) (various examples of which are described herein) and sending control signals to a plurality of actuators 281 (e.g. same as 81) (various examples of which are described herein). As one example, sensors 216 may include fuel tank pressure transducer (FTPT) 291, ambient temperature sensor 299, and canister temperature sensor 290. Other sensors such as exhaust oxygen sensor 233, exhaust temperature sensor 237, and other pressure, temperature, oxygen, hydrocarbon, air/fuel ratio, and composition sensors may be coupled to various locations in the vehicle system 206. As another example, the actuators may include cooling fan 92, electric auxiliary pump 88, electric thermostat (e.g. 38), canister vent valve 297, canister purge valve 261, and fuel tank isolation valve 252. The controller 212 may be shifted between sleep and wake-up modes for additional energy efficiency. During a sleep mode the controller may save energy by shutting down on-board sensors, actuators, auxiliary components, diagnostics, etc. Essential functions, such as clocks and controller and battery maintenance operations may be maintained on during the sleep mode, but may be operated in a reduced power mode. During the sleep mode, the controller will expend less current/voltage/power than during a wake-up mode. During the wake-up mode, the controller may be operated at full power, and components operated by the controller may be operated as dictated by operating conditions. The controller may receive signals from the various sensors of FIGS. 1-2, process the signals, and trigger the various actuators of FIGS. 1-2 in response to the processed signals based on instruction or code programmed therein corresponding to one or more routines. Example control routines are described herein with regard to FIGS. 6, and 9-12.

Undesired evaporative emissions detection routines may be intermittently performed by controller 212 on fuel system 218 and emissions control system 251 to confirm that the systems are not degraded. As such, undesired evaporative emissions detection routines may be performed while the engine is off using engine-off natural vacuum (EONV) generated due to a change in temperature and pressure at the fuel tank following engine shutdown and/or with vacuum supplemented from a vacuum pump (e.g. 295). Alternatively, undesired evaporative emissions detection routines may be performed while the engine is running by operating the vacuum pump and/or using engine intake manifold vacuum.

Undesired evaporative emissions test diagnostics may be performed by an evaporative level check module (ELCM) 295 communicatively coupled to controller 212. ELCM 295 may be coupled in vent 227, between canister 222 and the atmosphere. ELCM 295 may include a vacuum pump for applying negative pressure to the fuel system when administering an evaporative emissions test. In some embodiments, the vacuum pump may be configured to be reversible. In other words, the vacuum pump may be configured to apply either a negative pressure or a positive pressure on the evaporative emissions system 251 and fuel system 218. ELCM 295 may further include a reference orifice (e.g. 0.02") and a pressure sensor 296. A reference check may thus be performed whereby a vacuum may be drawn across the reference orifice, where the resulting vacuum level comprises a vacuum level indicative of an absence of undesired evaporative emissions. For example, following the reference check, the fuel system 218 and evaporative emissions system 251 may be evacuated by the ELCM vacuum pump. In the absence of undesired evaporative emissions, the vacuum may pull down to the reference check vacuum level. Alternatively, in the presence of undesired evaporative emissions, the vacuum may not pull down to the reference check vacuum level.

As one example, such a diagnostic may be initiated at a specified time (e.g. 6-8 hours after a key-off event, or vehicle-off event), to allow for reduced (low) noise, static conditions (e.g. stable fuel temperature within a predetermined threshold of ambient temperature, stable engine temperature within a predetermined threshold of ambient temperature, etc.), for conducting the diagnostic. Conducting the diagnostic under such conditions may provide more accurate and robust results. In such an example, the controller may be put to sleep, and may be triggered to be awoken at the specified time in order to conduct the diagnostic, in response to a timer elapsing for example. However, as discussed above and which will be discussed in further detail below, for vehicles participating in car sharing models, there may not be sufficient vehicle-off time to enable such a diagnostic to be conducted at such a specified time when the engine system and fuel system have sufficiently cooled. Accordingly, it may be desirable to rapidly cool the engine system (and fuel system, and evaporative emissions system) for such vehicles in order to initiate such a diagnostic at an earlier time in the vehicle-off condition, prior to the vehicle again being in operation.

While one such diagnostic (e.g. diagnostic for presence or absence of undesired evaporative emissions) is discussed above, there may be any number of other diagnostics that also rely on static, low noise conditions that may result after a 6-8 hour soak, which may benefit from more rapid cooling of the engine system, fuel system and/or evaporative emissions system. It may be understood that the systems and methods discussed herein may be applied to any vehicle-off diagnostic which may benefit from low-noise, static conditions.

As discussed above, vehicle system 206 (e.g. same as 100) may be a hybrid vehicle with multiple sources of torque available to one or more vehicle wheels 292 (e.g. same as 160). In the example shown, vehicle system 206 may include an electric machine 293 (e.g. same as 24). Electric machine 293 may be a motor or a motor/generator. Crankshaft 294 of engine 210 and electric machine 293 are connected via a transmission 254 to vehicle wheels 292 when one or more clutches 272 are engaged. In the depicted example, a first clutch is provided between crankshaft 294 and electric machine 293, and a second clutch is provided between electric machine 293 and transmission 254. Controller 212 may send a signal to an actuator of each clutch 272 to engage or disengage the clutch, so as to connect or disconnect crankshaft 294 from electric machine 293 and the components connected thereto, and/or connect or disconnect electric machine 293 from transmission 254 and the components connected thereto. Transmission 254 may be a gearbox, a planetary gear system, or another type of transmission. The powertrain may be configured in various manners including as a parallel, a series, or a series-parallel hybrid vehicle.

Electric machine 293 receives electrical power from a traction battery 258 (e.g. same as 26) to provide torque to vehicle wheels 292. Electric machine 293 may also be operated as a generator to provide electrical power to charge traction battery 258, for example during a braking operation.

Vehicle system 206 may be configured with S/S feature 298 (also referred to herein as a S/S system) communicatively coupled to control system 214, wherein the control system 214 may automatically shut down (idle-stop) the internal combustion engine 210, without receiving operator input to shut down the engine, if selected idle-stop conditions are met. These may include, for example, torque demand being less than a threshold, engine speed less than a threshold engine speed, vehicle speed below a threshold vehicle speed (e.g. 5 mph) the energy storage device being sufficiently charged, no request being received for air-conditioning, etc. Likewise, the engine may be automatically restarted responsive to the torque demand being higher than the threshold, the battery requesting to be charged, an air-conditioning compressor requesting to be operated, etc. In one example, the engine may be restarted responsive to the operator applying the accelerator pedal after being stopped for a duration (e.g. at a traffic signal). The engine may be cranked unfueled via the motor or electric machine coupled to a crankshaft of the engine, until a desired engine speed is reached, after which the motor or electric machine may be disabled and engine fueling may be resumed. Thereafter engine combustion may be able to support engine spinning. As a result of the automatic start/stops, fuel consumption and exhaust emissions can be reduced.

The controller 212 may be coupled to a wireless communication device 256 for direct communication of the vehicle system 206 with a network cloud 260. Using wireless communication 250 via the wireless communication device 256, the vehicle system 206 may retrieve data regarding current and/or upcoming ambient conditions (such as ambient humidity, temperature, pressure, etc.) from the network cloud 260. In one example, at completion of a drive cycle, a database 213 within the controller 212 may be updated with route information including driver behavioral data, engine operating conditions, date and time information, traffic information, traveled routes, etc.

Controller 212 may be communicatively coupled to other vehicles or infrastructures using appropriate communications technology, as is known in the art. For example, control system 214 may be coupled to other vehicles or infrastructures via wireless communication 250 which may comprise Wi-Fi, Bluetooth, a type of cellular service, a wireless data transfer protocol, and so on. Control system 214 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles and/or infrastructures can be either direct between vehicles/infrastructures, or can be multi-hop. In some examples, longer range communications (e.g. WiMax) may be used in place of, or in conjunction with, V2V, V2I2V, etc., to extend the coverage area by a few miles. In still other examples, vehicle control system 214 may be in wireless communication 250 with other vehicles or infrastructures via network cloud 260 and the internet.

Vehicle system 206 may also include an on-board navigation system 284 (for example, a Global Positioning System). The navigation system 284 may include one or more location sensors for assisting in estimating vehicle speed, vehicle altitude, vehicle position/location, etc. As discussed above, control system 214 may further be configured to receive information via the internet or other communication networks. Information received from the GPS may be cross-referenced to information available via the internet to determine local weather conditions, local vehicle regulations, etc. In some examples, information from the GPS may enable vehicle location information, traffic information, etc., to be collected via the vehicle.

Figure 3A:
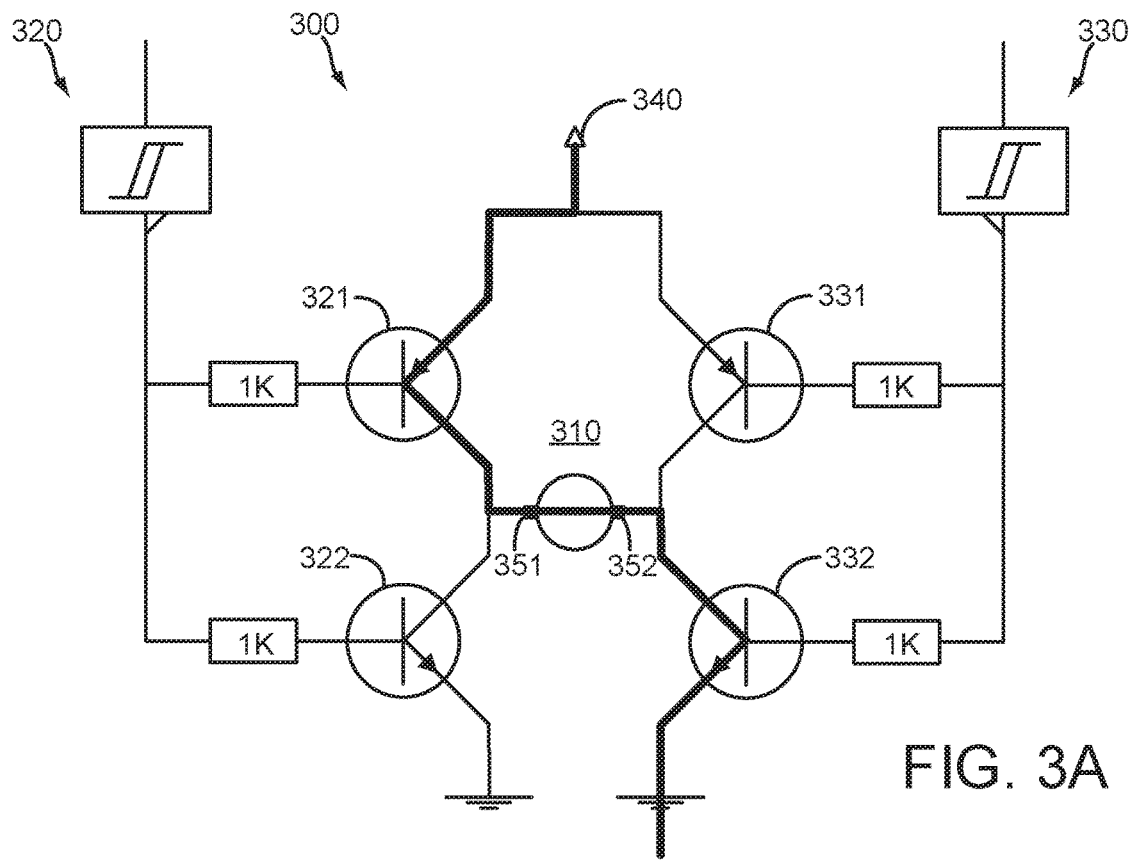
FIGS. 3A-3B depict example H-bridge circuitry which may be used to rotate a cooling fan in a first or second direction.
Figure 3B:
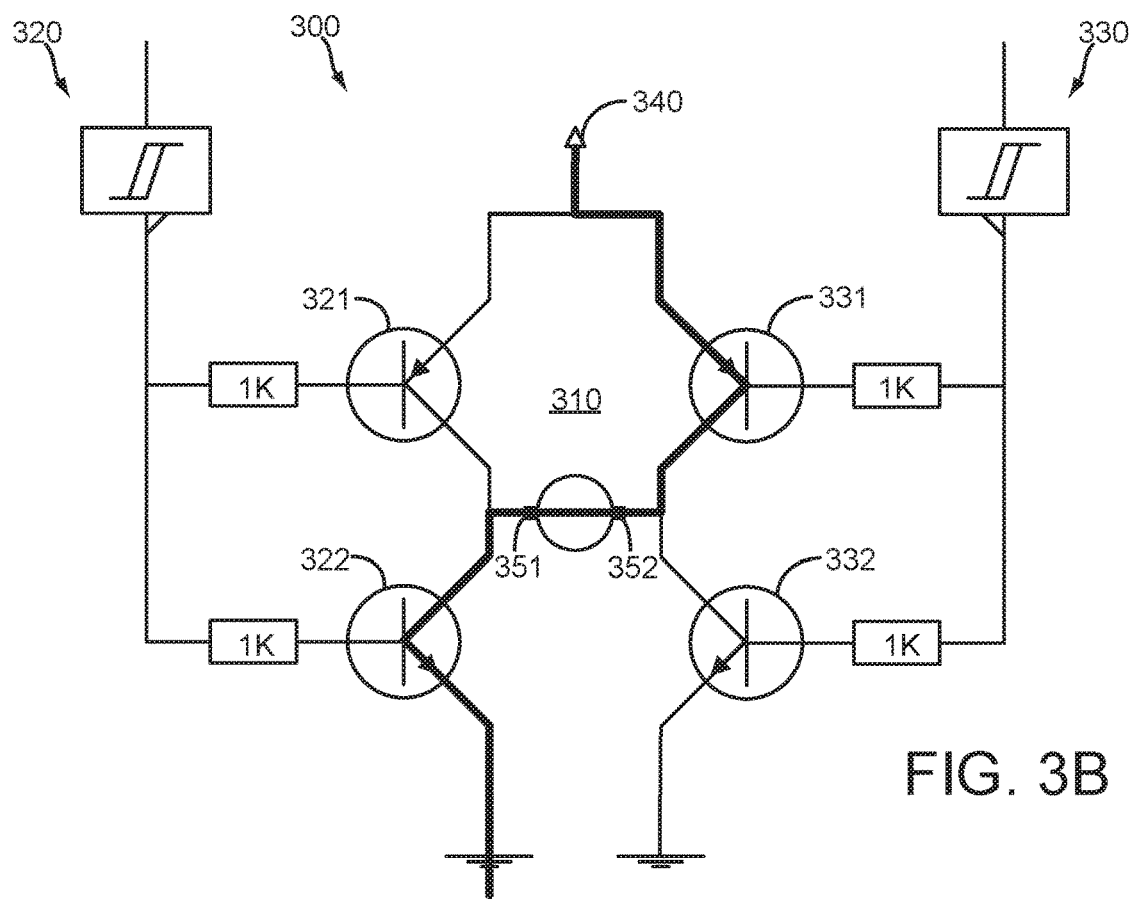

As discussed above, the cooling fan (e.g. 92) may be reversible, to either rotate in the first direction or the second direction (see FIG. 1). Such capability may be enabled via an H-bridge circuit. Accordingly, FIGS. 3A-3B show an example circuit 300 that may be used for reversing a spin orientation of the cooling fan. Such a circuit may be used to spin the cooling fan in the first direction or the second direction. Circuit 300 comprises a first (LO) side 320 and a second (HI) side 330. Side 320 includes transistors 321 and 322, while side 330 includes transistors 331 and 332. Circuit 300 further includes a power source 340.

In FIG. 3A, transistors 321 and 332 are activated (energized), while transistors 322 and 331 are off. In this configuration, the left lead 351 of motor 310 is connected to power source 340, and the right lead 352 of motor 310 is connected to ground. In this way, the motor 310 and in turn the cooling fan may run in the first direction.

In FIG. 3B, transistors 322 and 331 are activated (energized), while transistors 321 and 332 are off. In this configuration, the right lead 352 of motor 310 is connected to power source 340, and the left lead 351 of motor 310 is connected to ground. In this way, the motor 310 and in turn the cooling fan may run in the second direction.

Figure 4:
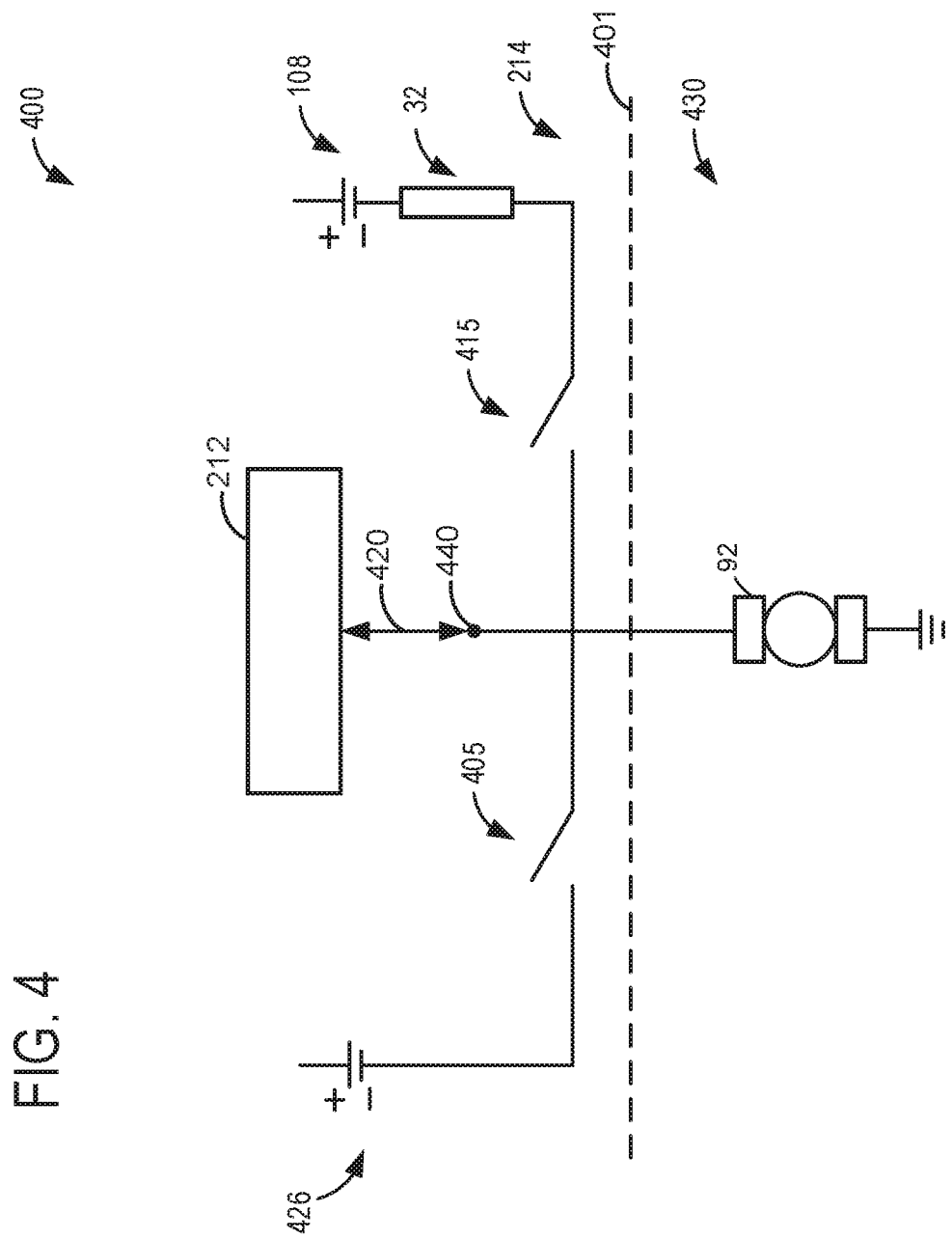
FIG. 4 shows a schematic depiction of circuitry for cooling fan activation.

Turning now to FIG. 4, as discussed above, the cooling fan may be activated during vehicle-off conditions, and may rely on solar power during such conditions. Alternatively, during vehicle operating conditions such as when the engine is in operation to combust air and fuel, the cooling fan may rely on power supplied from an onboard energy storage device, such as a battery 426 (e.g. 12V battery). For example illustration 400 depicted at FIG. 4, it illustrates a control system 214 and a field or plant 430, the field including the physical cooling fan 92, the field and the control system separated by dashed line 401.

The control system 214 further includes the controller 212, a first field effect transistor (FET) 405, and a second FET 415. The first FET 405 may only energize during key-on conditions, where the cooling fan 92 may thus be supplied by power from the battery 426. In some examples, turning a key to activate the vehicle, initiation of a remote start via a key fob, or depression of an activation button on the vehicle dash, may result in the first FET 405 being energized to enable power from the battery 426 to power cooling fan 92 at an output voltage 440 under input 420 from controller 212. Alternatively, in response to a key-off event, the first FET 405 may be de-energized, and the second FET 415 may be energized, to enable the solar panels 108 to supply power via charge controller 32 to cooling fan 92, at an output voltage 440 under input from controller 212. As discussed above, in some examples, power from the solar panels may be from solar battery (e.g. 30).

The systems and methods discussed herein may be particularly suited for autonomous vehicles participating in car sharing models. Accordingly, turning to FIG. 5, it depicts a block diagram of an example autonomous driving system 500 that may operate the vehicle system 100, described above at FIG. 1. Herein, the vehicle system 100 will be referred to simply as a "vehicle." The autonomous driving system 500, as shown, includes a user interface device 510, a navigation system 515 (e.g. same as 284), at least one autonomous driving sensor 520, and an autonomous mode controller 525.

The user interface device 510 may be configured to present information to vehicle occupants, under conditions wherein a vehicle occupant may be present. However, it may be understood that the vehicle may be operated autonomously in the absence of vehicle occupants, under certain conditions. The presented information may include audible information or visual information. Moreover, the user interface device 510 may be configured to receive user inputs. Thus, the user interface device 510 may be located in the passenger compartment (not shown) of the vehicle. In some possible approaches, the user interface device 510 may include a touch-sensitive display screen.

The navigation system 515 may be configured to determine a current location of the vehicle using, for example, a Global Positioning System (GPS) receiver configured to triangulate the position of the vehicle relative to satellites or terrestrial based transmitter towers. The navigation system 515 may be further configured to develop routes from the current location to a selected destination, as well as display a map and present driving directions to the selected destination via, for example, the user interface device 510.

The autonomous driving sensors 520 may include any number of devices configured to generate signals that help navigate the vehicle. Examples of autonomous driving sensors 520 may include a radar sensor, a lidar sensor, inertial sensors, a vision sensor (e.g. a camera), ultrasonic sensors, infrared camera, vehicle to vehicle infrastructure networks, or the like. The autonomous driving sensors 520 may enable the vehicle to "see" the roadway and vehicle surroundings, and/or negotiate various obstacles while the vehicle 100 is operating in autonomous mode. The autonomous driving sensors 520 may be configured to output sensor signals to, for example, the autonomous mode controller 525.

The autonomous mode controller 525 may be configured to control one or more subsystems 530 via a controller area network 531 (represented by double-sided arrows) while the vehicle is operating in the autonomous mode. Examples of subsystems 530 that may be controlled by the autonomous mode controller 525 may include a brake subsystem, a suspension subsystem, a steering subsystem, and a powertrain subsystem. The autonomous mode controller 525 may control any one or more of these subsystems 530 by outputting signals to control units associated with subsystems 530. In one example, the brake subsystem may comprise an anti-lock braking subsystem, configured to apply a braking force to one or more of wheels (e.g. 160). To autonomously control the vehicle, the autonomous mode controller 525 may output appropriate commands to the subsystems 530. The commands may cause the subsystems to operate in accordance with the driving characteristics associated with the selected driving mode. For example, driving characteristics may include how aggressively the vehicle accelerates and decelerates, how much space the vehicle leaves behind a front vehicle, how frequently the autonomous vehicle changes lanes, etc.

Thus, the systems described above with regard to FIGS. 1-5 may enable a system for a hybrid vehicle, comprising an engine system, a cooling fan operable to be rotated in a first direction and a second direction, a cooling system including an electric coolant pump and an electric thermostat including a thermostat valve, and an engine coolant temperature sensor. Such a system may include a controller with computer readable instructions stored on non-transitory memory that when executed, cause the controller to, at a vehicle-off event, command on the electric coolant pump, activate the electric thermostat to open the thermostat valve, and rotate the cooling fan in the first direction for a predetermined duration and record a first engine system temperature decay rate via the engine coolant temperature sensor, then rotate the cooling fan in the second direction for the predetermined duration and record a second engine system temperature decay rate. The controller may store further instructions to compare the first engine system temperature decay rate to the second engine system temperature decay rate. The controller may store further instructions to cool the engine system to within a threshold of an ambient temperature by rotating the cooling fan in a direction according to whether the first engine system temperature decay rate is faster than the second engine system temperature decay rate, or vice versa. The controller may store further instructions to conduct a diagnostic that relies on engine system static and low-noise conditions responsive to the engine system being cooled to within the threshold of ambient temperature.

In an example of the system, the system may further comprise an autonomous driving system, and the controller may stores further instructions to operate the vehicle via the autonomous driving system as part of a car-sharing model.

In such a system, the system may further comprise a grill shutter system including grill shutters, and the controller may store further instructions to command fully open the grill shutters for rotating the cooling fan in both the first direction and the second direction at the vehicle-off event.

In such a system, the system may further comprise one or more solar cells 108, operative to convert solar radiation into electrical energy, and the controller may store further instructions to operate the electric coolant pump, the electric thermostat, and the cooling fan via electrical energy supplied via the one or more solar cells.

It may be desirable, as will be discussed in further detail below with regard to the methods depicted at FIGS. 8-9, for the vehicle controller to learn commonly traveled routes. Such route learning may enable a determination as to whether it is likely at a particular vehicle-off event that the engine system may be more rapidly cooled by operating the cooling fan in the first direction as opposed to the second direction, or vice versa. In other words, which direction of cooling fan rotation results in the fastest engine system temperature decay rate. Accordingly, turning now to FIG. 6, a high level example method 600 for learning common driving routes driven in a vehicle, is shown. More specifically, method 600 may be utilized to learn common driving routes, and may further be utilized to learn/predict what vehicle-off conditions along particular routes result in more rapid cooling of the engine when the cooling fan is rotated in the first direction, as compared to rotated in the second direction, and vice versa. As an example, a vehicle may travel a particular route in the morning consistently, where the vehicle is then parked in such a way that cooling of the engine is fastest when the cooling fans are operated to push air from the engine compartment to atmosphere (e.g. cooling fan rotated in the second direction). At a later time, the vehicle may again travel a particular route where it is learned that when the vehicle is turned off, cooling of the engine system is fastest when the cooling fans are operated to pull air from atmosphere into the engine compartment (e.g. cooling fan rotated in the first direction). Such information pertaining to learned routes may be stored in lookup table(s) stored at the vehicle controller, and may be used at least in part to select the appropriate method to most rapidly cool the engine system at vehicle-off events.

Method 600 will be described with reference to the systems described herein and shown in FIGS. 1-5, though it should be understood that similar methods may be applied to other systems without departing from the scope of this disclosure. Method 600 may be carried out by a controller, such as controller 212 in FIG. 2, and may be stored at the controller as executable instructions in non-transitory memory. Instructions for carrying out method 600 and the rest of the methods included herein may be executed by the controller based on instructions stored on a memory of the controller and in conjunction with signals received from sensors of the engine system, such as the sensors described above with reference to FIGS. 1-2 and FIG. 5. The controller may employ actuators such as cooling fan (e.g. 92), electric auxiliary pump (e.g. 88), thermostat (e.g. 38), etc., to alter states of devices in the physical world according to the methods depicted below.

Method 600 begins at 605 and may include indicating whether a key-on event is indicated. A key-on event may comprise an ignition key being utilized to start a vehicle either in an engine-on mode, or an electric only mode of operation. In other examples, a key-on event may comprise an ignition button on the dash, for example, being depressed. Other examples may include a key-fob (or other remote device including smartphone, tablet, etc.) starting the vehicle in either an engine-on mode, or an electric-only mode of operation. If, at 605, a key-on event is not indicated, method 600 may proceed to 610, and may include maintaining current vehicle operating parameters. For example, at 610, method 600 may include maintaining engine system, fuel system, and evaporative emissions system components in their current conformations and or current modes of operation. Method 600 may then end.

Returning to 605, responsive to a key-on event being indicated, method 600 may proceed to 615, and may include accessing vehicle location, driver information, day of the week (DOW), time of day (TOD), etc. A driver's identity (if a driver is present) may be input by the driver, or inferred based on driving habits, seat position, cabin climate control preferences, voice activated commands, etc. However, it may be understood that for autonomous vehicles, there may not be a driver or vehicle operator present. Vehicle location may be accessed via the onboard navigation system, for example via GPS, or other means such as via wireless communication with the internet.

Proceeding to 620, method 600 may include recording vehicle route information during the drive cycle commencing from the key-on event. The vehicle controller may continuously collect data from various sensor systems and outside sources regarding the vehicle's operations/conditions, location, traffic information, local weather information, etc. The data may be collected by, for example, GPS (e.g. 284), inertial sensors, ultrasonic sensors, lasers, radar, sonar, acoustic sensors, etc., (e.g. 520). Other feedback signals, such as input from sensors typical of vehicles may also be read from the vehicle. Example sensors may include tire pressure sensors, engine temperature sensors, brake heat sensors, brake pad status sensors, tire tread sensors, fuel sensors, oil level and quality sensors, and air quality sensors for detecting temperature, humidity, etc. Still further, at 620, the vehicle controller may also retrieve various types of non-real time data, for example information from a detailed map, which may be stored in at the controller or which may be retrieved wirelessly.

Accordingly, data regarding a particular vehicle driving route, or trip vector, may be obtained and stored at the vehicle controller during the course of the vehicle being driven along the particular route. Proceeding to 625, method 600 may include processing the data to establish predicted/learned driving routes. For example, numerous trip vectors and corresponding information may be obtained and stored at the vehicle controller, such that predicted/learned driving routes may be achieved with high accuracy. In some examples, a vehicle may travel route(s) that are not frequently traveled (e.g. not "common"). Thus, it may be understood that route information that is not correlated significantly with commonly driven routes may be periodically forgotten, or removed, from the vehicle controller, in order to prevent the accumulation of exorbitant amounts of data pertaining to vehicle travel routines.

In some examples data collected from the vehicle travel routines including GPS data may be applied to an algorithm that feeds into one or more machine learning algorithms to determine common vehicle travel routes.

Learning driving routes at 625 may include determining particular driving routes for which at the end of the particular route, a vehicle-off engine cooling operation was conducted, and what the outcome of the cooling operation was (e.g. what direction the cooling fan was rotated for the cooling operation) for the particular route. For example, learning driving routes at 625 may include information comprising, for particular vehicle-off events along said learned routes, that cooling of the engine system was more rapid when the cooling fans were rotated in the first direction, as compared to the second direction, or vice versa. Such information may be correlated with other information, such as current weather conditions including ambient temperature, presence or absence of precipitation (e.g. rain, snow, etc.), proximity to structures that may affect outcome of the engine system cooling operation, etc. In this way, it may be learned as to whether a particular vehicle-off event may comprise a probability greater than a threshold that engine system cooling may be more rapid when the cooling fan is rotated in the first direction as compared to the second direction, or vice versa.

Proceeding to 630, method 600 may include storing the information discussed pertaining to learned driving routes into one or more lookup table(s) at the vehicle controller. Such lookup tables may be utilized at least in part at vehicle-off event to indicate whether it is likely that engine system cooling will be more rapid when the cooling fan is rotated in the first direction as opposed to the second direction, or vice versa.

Depending on the time of day that the vehicle is driven and for which rapid engine cooling is desired at vehicle-off events, there may be situations where cooling fan activation (in either direction) may be avoided. Such examples may include vehicle-off events at night, where a natural cooling effect of the diurnal temperature cycle may effectively rapidly cool the engine system such that diagnostics may be conducted within a time frame desired. By relying on such a natural cooling effect, battery power may be conserved.

Figure 7:
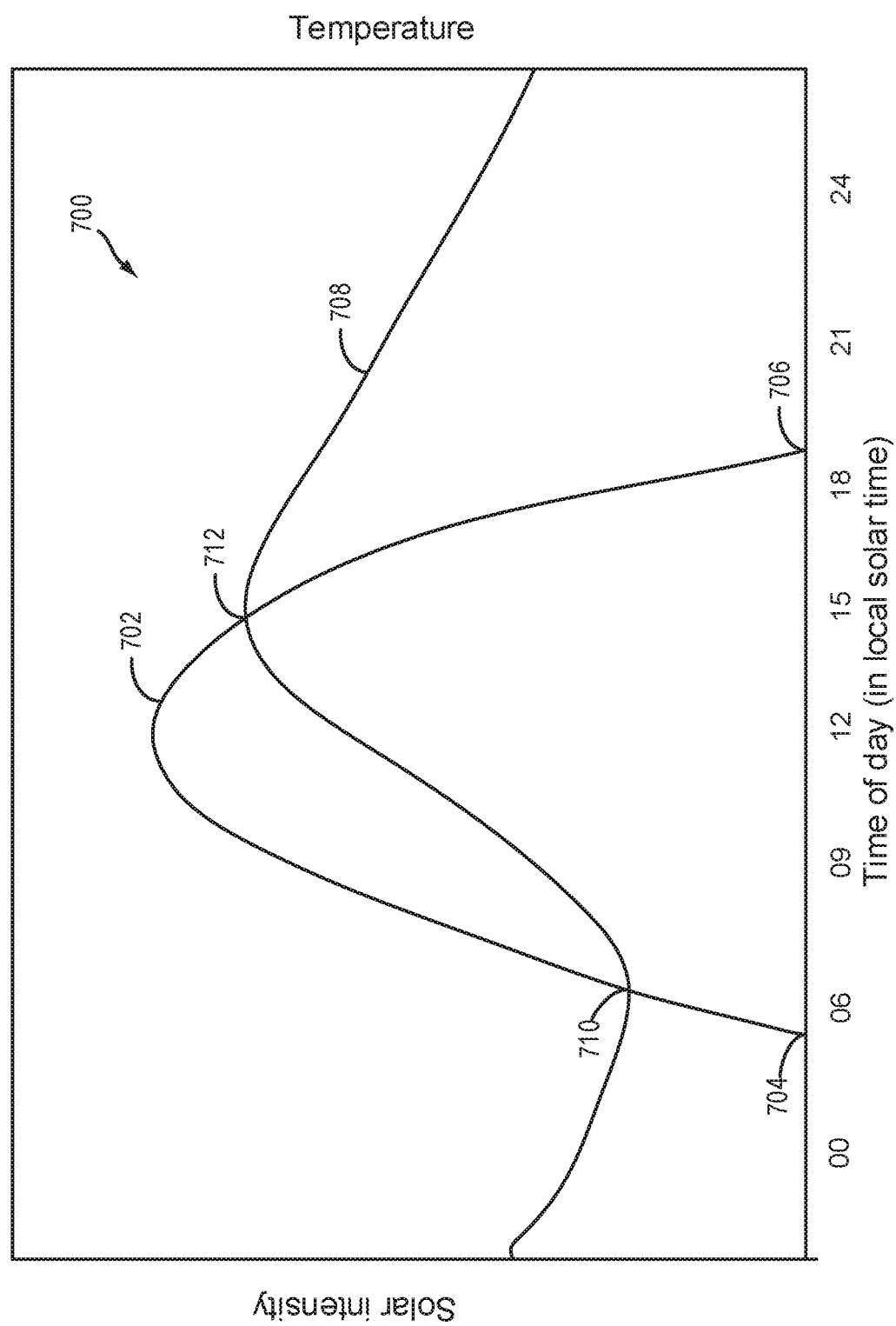
FIG. 7 shows a schematic depiction of temperature changes during a diurnal cycle.

Turning now to FIG. 7, an example illustration of a diurnal cycle 700 as a graph of solar intensity and temperature as a function of the time of day, is shown. Incoming solar radiation 702 begins increasing at sunrise 704, and rises to a maximum near mid-day before declining until sunset 706. As such, sunrise 704 marks a time of day near where a heat gain cycle is at its greatest, and sunset 706 marks a time of day near where a heat loss cycle is at its greatest. Accordingly, ambient temperature 708 is shown, illustrating the increase in temperature from a minimum temperature 710 near sunrise 704, and the decrease in temperature from a maximum temperature 712 near sunset 706. Accordingly, if a vehicle-off event is indicated at a time near sunset or thereafter where the heat loss cycle is greatest, then the natural cooling effect may effectively rapidly cool the engine system without operating the cooling fans, which may conserve onboard energy storage. Alternatively, during the heat gain cycle, it is likely that solar panels (e.g. 108) may provide sufficient energy to operate the cooling fans, auxiliary pump, electric thermostat, etc.

As discussed above, there may be certain situations where the vehicle is parked in such a way that operating the cooling fans in the second direction (push-cooling) may result in faster engine system cooling as compared to operating the cooling fans in the first direction (pull-cooling). In some examples, such parking situations may comprise learned vehicle-off events, and/or may be indicated via GPS, inertial sensors, onboard cameras, ultrasonic sensor(s), infrared cameras (for example to infer ground surface temperature), etc. Turning now to FIG. 8A, an illustration 800 of one example of such a parking situation includes a condition where the vehicle 100 is parked on a ground surface 805 that is inclined 801. With the vehicle 100 parked in such fashion, with a front 803 of the vehicle inclined with respect to a rear 804 of the vehicle, engine heat rises and flows to the front 803, in the direction of arrow 802. If the cooling fan (e.g. 92) is rotated in the first direction, hot air may be pulled back to the engine. Alternatively, if the cooling fan is rotated in the second direction, hot air may be pushed from the engine compartment to atmosphere, effectively cooling the engine compartment.

Figure 8B:
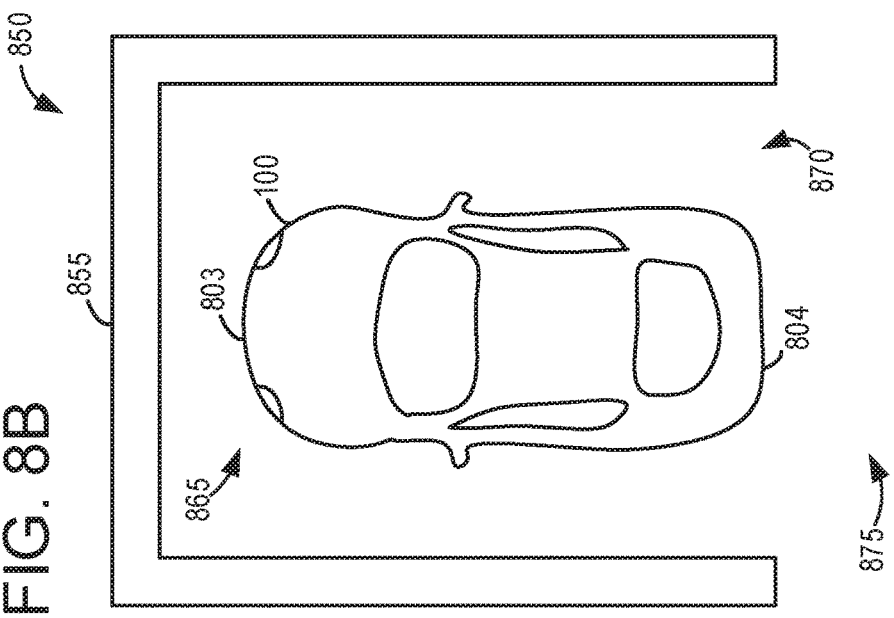
FIGS. 8A-8B depict example parking conditions where it may be more effective to rotate a cooling fan in one direction as opposed to the opposite direction, for rapidly cooling an engine system.
Figure 8A:
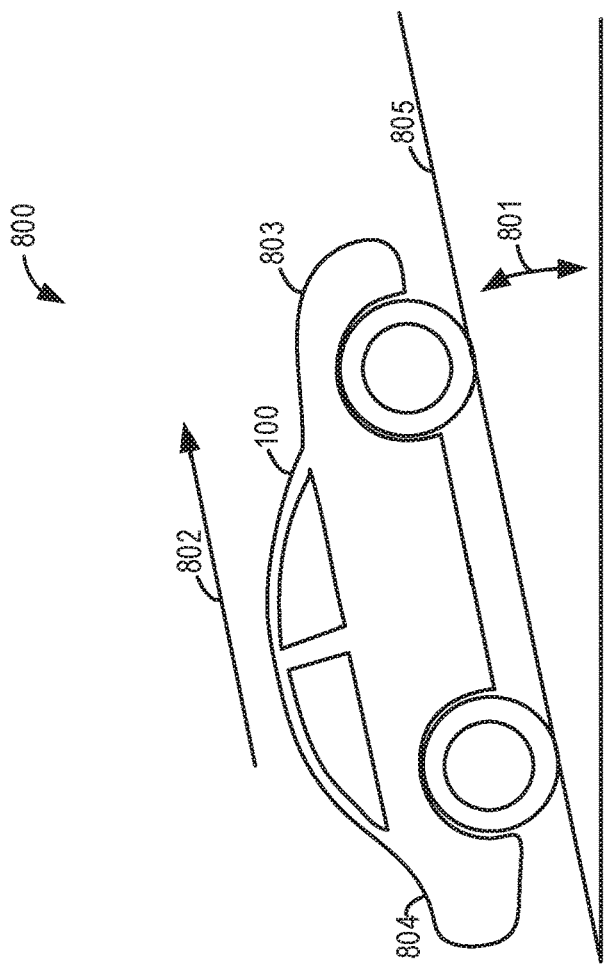

Turning now to FIG. 8B, another example illustration 850 of a parking situation where it may be more effective in terms of engine system cooling to rotate the cooling fan in the second direction as compared to the first direction, is shown. Specifically, the vehicle 100 may park with the front end 803 further into a parking structure 855 than the rear end 804. In such an example, stagnant entrained air 865 may be hotter than air 870 at the rear 804 of the vehicle. Thus, operating the cooling fan in the second direction (push-cooling) may more effectively and rapidly cool the engine system than if the cooling fan were operated in the first direction (pull-cooling), by expelling engine heat to the outside 875 and displacing the entrained air 865.

As discussed above, the vehicle control system (e.g. 214) may broadcast and receive information regarding vehicle data, vehicle diagnostics, vehicle location information, vehicle operating procedures, etc., via V2V, V2I2V (V2X) technology. Such technology may be relied upon at least in part, for determining whether to operate the cooling fan in the first direction or the second direction at a vehicle-off event to rapidly cool the engine system. More specifically, turning to FIG. 9, a high-level example method 900 for utilizing V2V2I2V technology to determine whether it is likely that operating the cooling fan in the first direction may more rapidly cool the engine system as compared to operating the cooling fan in the second direction, or vice versa, is shown. Method 900 may be carried out by a controller, such as controller 212 in FIG. 2, and may be stored at the controller as executable instructions in non-transitory memory. Instructions for carrying out method 900 may be executed by the controller based on instructions stored on a memory of the controller and in conjunction with signals received from sensors of the vehicle system, such as the sensors described above with reference to FIGS. 1-2 and FIG. 5.

Method 900 begins at 901 and may include indicating whether a vehicle-off event is indicated. A vehicle-off event may be indicated via a key-off event, use of a key-fob to deactivate the vehicle system, etc. If, at 901, a vehicle-off event is not indicated, method 900 may proceed to 902. At 902, method 900 may include maintaining current vehicle operating conditions. For example, if the vehicle is operating with the engine combusting air and fuel, such vehicle operation may be maintained. Method 900 may then end.

Returning to 901, if a vehicle-off event is indicated, method 900 may proceed to 905. At 905, method 900 may include generating a crowd of vehicles via V2V/V2I2V technology. The crowd of vehicles may be referred to as a select crowd of vehicles, a plurality of vehicles, a group of vehicles, a set of vehicles, etc. To generate the crowd of vehicles, the vehicle (referred to as the vehicle in this example methodology) comprising the vehicle-off event may send a wireless request to one or more vehicles within wireless communication or within a predetermined threshold distance or radius of the vehicle. The wireless request may comprise a request for information from the one or more vehicles, the information comprising data related to whether or not an active cooling operation was conducted, and what methodology was utilized (e.g. push-cooling or pull-cooling). Such information may further include a time that the active cooling operation was conducted, weather conditions at the time the cooling operation was conducted, proximity to structures that may affect the active cooling operation, ground surface composition and/or ground surface temperature during the active cooling operation, engine run-time prior to the active cooling operation, fuel level, vehicle make/model information, presence or absence of a sealed fuel system, fuel tank pressure data, fuel tank temperature data, engine system temperature data, etc. Only those vehicles comprising the one or more vehicles for which conditions are similar (e.g. similar vehicle make/model, similar parking conditions, similar weather conditions at the time of active cooling, similar ground surface composition/temperature, similar engine run-time prior to conducting the active cooling operation, similar fuel system status, similar point of the diurnal cycle for which the active cooling operation was conducted, etc.) may be selected for the crowd. Other vehicles may be excluded from the crowd.

Proceeding to 910, method 900 may include retrieving crowd data from the crowd pertaining to what methodology was utilized in order to conduct the cooling operation. For example, whether push-cooling was employed or whether pull-cooling was employed.

Proceeding to 915, method 900 may include processing the crowd data, to provide a high-confidence indication of what methodology would be most likely to result in the most effective and rapid engine system cooling for the vehicle.

Proceeding to 920, method 900 may include taking into account said crowd data in order to determine what procedure (push-cooling or pull-cooling) to use to effectively and rapidly cool the engine system. For example, the crowd data may be used in conjunction with method 1000 depicted at FIG. 10 and/or in conjunction with method 1100 depicted at FIG. 11.

Turning now to FIG. 10, a high-level flowchart for an example method 1000 for predicting whether operating the cooling fan in the first direction (pull-cooling) is expected to result in faster cooling of the engine system as opposed to operating the cooling fan in the second direction (push-cooling), or vice versa, is shown. If a probability is greater than a threshold that operation of the cooling fan in one direction is preferred over operating the cooling fan in the opposite direction, then active engine system cooling may be conducted via operating the cooling fan in the appropriate indicated direction. Alternatively, if the probability is not greater than the threshold, method 1000 may proceed to method 1100 depicted at FIG. 11.

Method 1000 will be described with reference to the systems described herein and shown in FIGS. 1-5, though it should be understood that similar methods may be applied to other systems without departing from the scope of this disclosure. Method 1000 may be carried out by a controller, such as controller 212 in FIG. 2, and may be stored at the controller as executable instructions in non-transitory memory. Instructions for carrying out method 1000 and the rest of the methods included herein may be executed by the controller based on instructions stored on a memory of the controller and in conjunction with signals received from sensors of the engine system, such as the sensors described above with reference to FIGS. 1-2 and FIG. 5. The controller may employ actuators such as cooling fan (e.g. 92), electric auxiliary pump (e.g. 88), thermostat (e.g. 38) etc., according to the methods depicted below.

Method 1000 begins at 1005 and may include evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Continuing at 1010, method 1000 includes indicating whether a vehicle-off condition is detected. A vehicle-off condition may be indicated by a key-off event, a user setting a vehicle alarm following exiting a vehicle that has been parked, a vehicle-off condition initiated via a key-fob, or other suitable indicator in the case of an autonomous vehicle substantially equivalent to a key-off event. If a vehicle-off condition is not detected, method 1000 proceeds to 1015. At 1015, method 1000 includes maintaining current vehicle operating conditions. For example, if the vehicle is in operation with the engine combusting air and fuel, such vehicle operation may be maintained. Method 1000 may then end.

Returning to 1010, if a vehicle-off condition is detected, method 1000 proceeds to 1020. At 1020, method 1000 includes indicating whether conditions are met for active engine cooling via the operation of the cooling fan (e.g. 92). Conditions being met for active engine cooling may include an indication that the vehicle is participating in a car sharing model. Conditions being met may additionally or alternatively include an indication that the vehicle-off condition occurred during a heat-gain portion of the diurnal cycle, as opposed to a heat-loss portion of the diurnal cycle. Conditions being met may additionally or alternatively include an indication that a diagnostic that relies on engine system static and low-noise conditions is requested during the vehicle-off event. Conditions being met may additionally or alternatively include an indication that, provided a diagnostic is requested, that it is predicted that the vehicle-off event may be of a duration long enough to enable the diagnostic to be conducted responsive to the engine system being effectively cooled. Such an indication may be provided via, for example, learned routes (see FIG. 6), or in some examples a schedule may be stored at the controller and frequently updated as part of the car sharing model. Conditions being met at 1020 may additionally or alternatively include an indication that a level of onboard energy storage is greater than a threshold amount for active engine cooling, that there is sufficient energy in the form of solar energy for active engine cooling, or that the vehicle system is plugged into an electrical grid. Conditions being met at 1020 may additionally or alternatively include an indication that the engine was in operation for the drive cycle just prior to the vehicle-off event.

If conditions are not indicated to be met for active cooling of the engine system, method 1000 may proceed to 1025, where the controller may be put to sleep, and a schedule for conducting the diagnostic that relies on low-noise conditions may be updated. In one example, in response to conditions not being indicated to be met at 1020 because the vehicle-off event occurred during a heat-loss portion of the diurnal cycle, the diagnostic may be scheduled to be conducted at a specified time where it is predicted that the engine system will be cooled to within a threshold of ambient temperature (e.g. within 12° F. of ambient temperature). Such a prediction may rely on current and predicted weather conditions (e.g. temperature, presence/absence of precipitation, wind, etc.), current engine system temperature, fuel level, fuel temperature, etc. In such an example, the controller may be scheduled to wake at the specified time in order to conduct the diagnostic, provided the vehicle has not been reactivated to operate prior to the specified time.

Alternatively, at 1025, in an example where conditions are not indicated to be met for active engine cooling, and the vehicle-off event occurred during a heat-gain portion of the diurnal cycle, updating the schedule for conducting the diagnostic may include scheduling the diagnostic for the next vehicle-off event. Method 1000 may then end.

Returning to 1020, responsive to conditions being met for active engine cooling, method 1000 may proceed to 1030. At 1030, method 1000 may include indicating whether a probability is greater than a threshold that one of either pull cooling (operating the cooling fan in the first direction) or push cooling (operating the cooling fan in the second direction) is predicted to be more effective than the other, for rapidly and effectively cooling the engine system. As discussed above, such an indication may be based on whether the vehicle-off event comprises a vehicle-off event corresponding to a learned route (see FIG. 6), where it has been learned over time that there is a high probability that one method for engine system cooling will be more effective than the other method. Such an indication may additionally or alternatively be based on V2V/V2I2V communications via use of the methodology depicted at FIG. 9. Such an indication may additionally or alternatively be based on vehicle parking conditions indicated, for example, via GPS, inertial sensors, ultrasonic sensors, onboard cameras, infrared cameras, etc. For example, as discussed above with regard to FIGS. 8A-8B, if the vehicle-off event includes the vehicle being parked on an incline, push-cooling (operating the cooling fan in the second direction) may be more effective for rapid engine cooling. In another example, if the vehicle-off event includes the vehicle being parked with its front-end inside a structure with entrained air, then push cooling may be more effective at rapidly cooling the engine system by displacing the entrained air.

Figure 11:
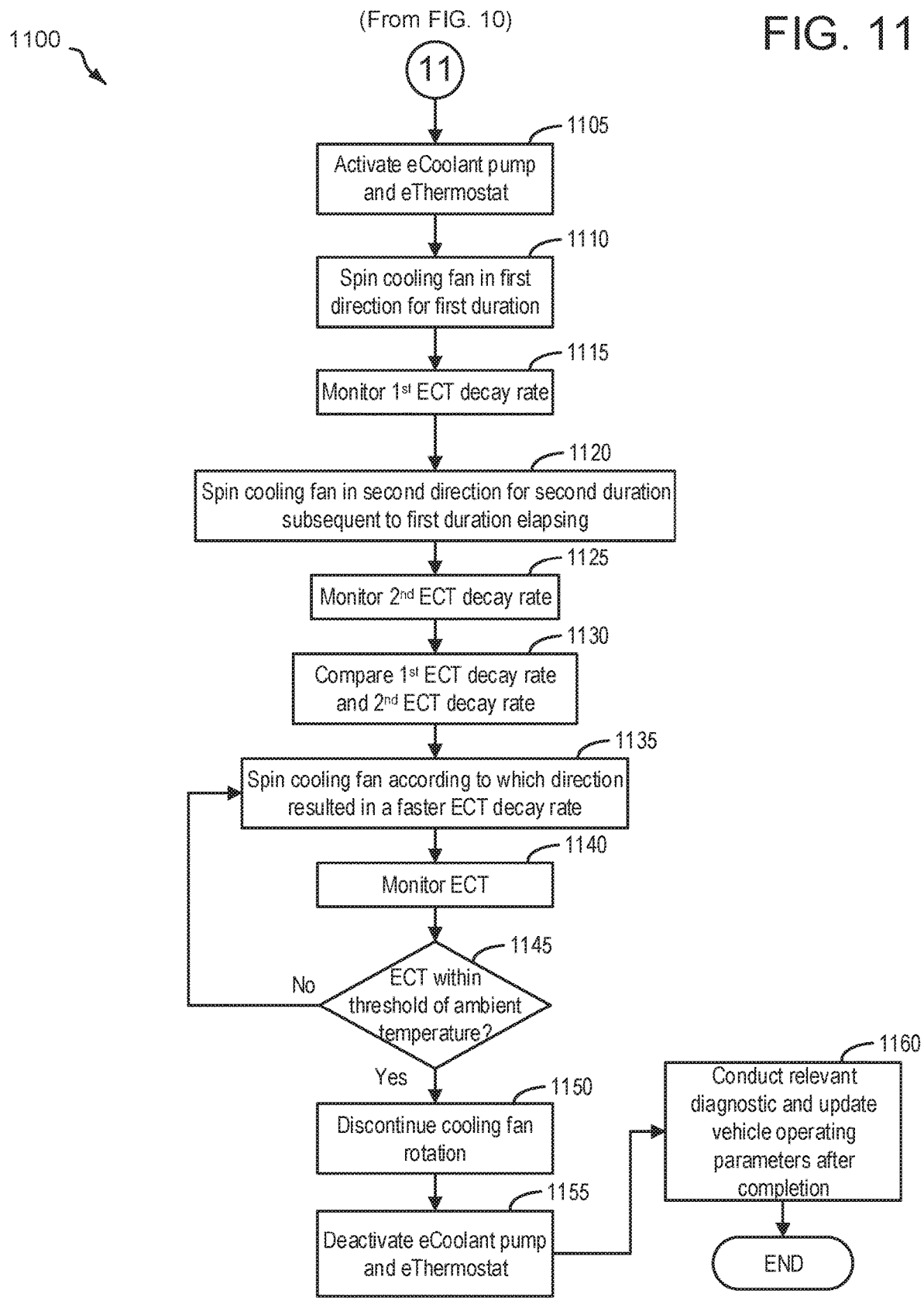
FIG. 11 depicts a high level flowchart that continues from the flowchart depicted at FIG. 10, for actively determining a direction of rotation of the cooling fan that will result in the fastest rate of engine cooling.

If at 1030, the probability that use of one cooling method as compared to the other cooling method is not greater than the threshold, method 1000 may proceed with active cooling according to method 1100 depicted at FIG. 11. Alternatively, if the probability that use of one cooling method as compared to the other cooling method is greater than the threshold, method 1000 may proceed to 1035. At 1035, method 1000 may include activating the electric auxiliary pump (e.g. 88) and electrically actuating the thermostat (e.g. 38) to allow coolant to flow through the thermostat (in other words, electrically opening the thermostat valve). Proceeding to 1040, method 1000 may include spinning/rotating the cooling fan in the appropriate direction. For example, if at 1030 it was indicated that the probability is greater than the threshold that rotating the cooling fan in the first direction will result in the most rapid engine cooling, then at 1040 the cooling fan may be rotated in the first direction. Alternatively, if at 1030 it was indicated that the probability is greater than the threshold that rotating the cooling fan in the second direction will result in the most rapid engine cooling, then at 1040 the cooling fan may be rotated in the second direction.

At 1040, rotating the cooling fan in the appropriate direction may include rotating the cooling fan at a predetermined speed, in some examples. In other examples, cooling fan speed may be a function of engine temperature, predicted, learned, or scheduled time until the vehicle is again activated to operate, fuel temperature, drive cycle aggressiveness for the drive cycle just prior to the vehicle-off event, level of onboard energy storage or amount of power available via solar energy, etc. In some examples, speed of the cooling fan may be related to a desired duration of time for cooling the engine system to within the threshold of ambient temperature. Furthermore, while not explicitly illustrated, it may be understood that grill shutters may be commanded fully open for rotating the cooling fan in the appropriate direction at 1040.

With the cooling fan rotating, method 1000 may proceed to 1045. At 1045, method 1000 includes indicating whether engine coolant temperature is within the threshold (e.g. within 12° F.) of ambient temperature. If not, method 1000 may return to 1040 where the cooling fan may be maintained spinning in the appropriate direction. Alternatively, responsive to engine coolant temperature being indicated to be within the threshold of ambient temperature, method 1000 may proceed to 1050. At 1050, method 1000 may include discontinuing cooling fan rotation. In other words, the cooling fan may be commanded to be stopped from rotating in the appropriate direction. Proceeding to 1055, method 1000 may include deactivating the auxiliary pump, and deactivating the thermostat (e.g. 38) (in other words, controlling the thermostat valve to a closed configuration).

With the engine cooled to within the threshold, proceeding to 1060, method 1000 may include conducting the particular diagnostic requested via the controller that relies upon engine system static, low-noise conditions. As one example, if the diagnostic includes an evaporative emissions system test for presence or absence of undesired evaporative emissions, then as discussed, a pump (e.g. 295) may be used to evacuate the evaporative emissions system in order to conduct the test. While the evaporative emissions test diagnostic is provided as an example, it may be understood that any diagnostic that relies on engine system static and low-noise conditions may be conducted at 1060, provided there is a request to conduct such a diagnostic.

It may be understood that conducting any such diagnostic at 1060 may rely on another method or sub-method, stored at the controller as instructions in non-transitory memory.

Responsive to the particular diagnostic being conducted, vehicle operating parameters may be updated as a function of results of the diagnostic. For example, if a presence of undesired evaporative emissions is indicated via the diagnostic, then a malfunction indicator light may be illuminated at the vehicle dash, alerting the vehicle operator of a request to service the vehicle. Method 1000 may then end.

Turning now to FIG. 11, a high-level example method 1100 for conducting an active engine system cooling operation via rotating the cooling fan in both the first direction and the second direction to determine which direction of rotation results in the fastest rate of engine system cooling, is shown. Method 1100 will be described with reference to the systems described herein and shown in FIGS. 1-5, though it should be understood that similar methods may be applied to other systems without departing from the scope of this disclosure. Method 1100 may be carried out by a controller, such as controller 212 in FIG. 2, and may be stored at the controller as executable instructions in non-transitory memory. Instructions for carrying out method 1100 and the rest of the methods included herein may be executed by the controller based on instructions stored on a memory of the controller and in conjunction with signals received from sensors of the engine system, such as the sensors described above with reference to FIGS. 1-2 and FIG. 5. The controller may employ actuators such as cooling fan (e.g. 92), electric auxiliary pump (e.g. 88), etc., according to the methods depicted below to change the physical state of one or more devices in the real world.

Method 1100 continues from step 1030, and includes at 1105 activating the auxiliary pump (e.g. 88), and electrically activating the electronic thermostat (e.g. 38). Proceeding to 1110, method 1100 includes rotating the cooling fan in the first direction for a first duration. The duration may comprise an amount of time to enable a rate of engine system cooling to be determined. As an example, the duration may comprise less than 5 seconds, 5 seconds, 10 seconds, 15 seconds, 20 seconds, greater than 20 seconds but less than 40 seconds, greater than 40 seconds but less than 1 minute, etc. Proceeding to 1115, method 1100 includes, while the cooling fan is spun in the first direction, obtaining engine coolant temperature measurements periodically, for example once every second, once every 5 seconds, etc. In this way, a first engine coolant temperature decay rate may be determined, corresponding to engine system cooling.

Proceeding to 1120, responsive to the first duration elapsing and the first engine coolant temperature decay rate being determined, method 1100 may include rotating the cooling fan in the second direction for a second duration. While not explicitly illustrated, it may be understood that between rotating the cooling fan in the first direction and rotating the cooling fan in the second direction, the cooling fan may first be deactivated. While the cooling fan is deactivated between rotating the cooling fan in the first direction and the second direction, the auxiliary pump (e.g. 88) may be maintained activated, along with the electronically-actuated thermostat (e.g. 38). It may be understood that the first duration may comprise the same duration as the second duration. Furthermore, it may be understood that the cooling fan may be rotated at the same speed when rotated in the first direction as when rotated in the second direction. Such a speed may comprise a predetermined speed, for example.

With the cooling fan activated to rotate in the second direction at 1120, method 1100 proceeds to 1125, and may include monitoring a second engine coolant temperature decay rate. The second engine coolant temperature decay rate may be determined in the same fashion as the first engine coolant temperature decay rate as discussed above with regard to step 1115.

Responsive to the second engine coolant temperature decay rate being determined at 1125, method 1100 may proceed to 1130. At 1130, method 1100 may include, via the controller, comparing the first engine coolant temperature decay rate to the second engine coolant temperature decay rate. Comparing the first engine coolant temperature decay rate to the second engine coolant temperature decay rate at 1130 may include indicating which engine coolant temperature decay rate is greater, or faster.

Proceeding to 1135, method 1100 may include rotating the cooling fan according to which direction of rotation of the cooling fan resulted in the faster engine coolant temperature decay rate. For example, if the cooling fan was first rotated in the first direction and then the second direction to determine the first and second engine coolant temperature decay rates, respectively, and it was indicated that the first engine coolant temperature decay rate is fastest, then at 1135 method 1100 may include stopping rotating the cooling fan in the second direction, and commencing rotating the cooling fan in the first direction. Alternatively, if the cooling fan was first rotated in the first direction and then the second direction to determine the first and second engine coolant temperature decay rates, respectively, and it was indicated that the second engine coolant temperature decay rate is fastest, the engine cooling fan may be continued to be spun in the second direction at 1135. While method 1100 is depicted as first rotating the cooling fan in the first direction and then rotating the cooling fan in the second direction, it may be understood that the cooling fan may be first rotated in the second direction and then rotated in the first direction, without departing from the scope of this disclosure.

Proceeding to 1140, method 1100 may include monitoring engine coolant temperature.

Proceeding to 1145, method 1100 may include indicating whether engine coolant temperature is within the threshold of ambient temperature (e.g. within 12° F. of ambient temperature). If not, method 1100 may return to 1135 where the cooling fan may be continued to be rotated in the direction that was indicated to result in the fastest engine coolant temperature decay rate. Alternatively, if engine coolant temperature is indicated to be within the threshold of ambient temperature at 1145, method 1100 may proceed to 1150. At 1150, method 1100 may include discontinuing cooling fan rotation. In other words, the controller may send a signal an actuator of the cooling fan, actuating it off. Proceeding to 1155, method 1100 may include deactivating the auxiliary pump (e.g. 88), and deactivating the electronically-actuated thermostat valve (e.g. 38).

With the engine cooled to within the threshold, proceeding to 1160, method 1100 may include conducting the particular diagnostic requested via the controller that relies upon engine system static, low-noise conditions. As one example, if the diagnostic includes an evaporative emissions system test for presence or absence of undesired evaporative emissions, then as discussed, a pump (e.g. 295) may be used to evacuate the evaporative emissions system in order to conduct the test. While the evaporative emissions test diagnostic is provided as an example, it may be understood that any diagnostic that relies on engine system static and low-noise conditions may be conducted at 1160, provided there is a request to conduct such a diagnostic.

It may be understood that conducting any such diagnostic at 1160 may rely on another method or sub-method, stored at the controller as instructions in non-transitory memory.

Responsive to the particular diagnostic being conducted, vehicle operating parameters may be updated as a function of results of the diagnostic. For example, if a presence of undesired evaporative emissions is indicated via the diagnostic, then a malfunction indicator light may be illuminated at the vehicle dash, alerting the vehicle operator of a request to service the vehicle. Method 1100 may then end.

While not explicitly illustrated at method 1100, it may be understood that at the steps where cooling fans are activated in either direction, grill shutters (e.g. 174) may be commanded fully open.

Furthermore, while not explicitly illustrated at method 1100, there may in some examples be steps between step 1030 and step 1105, which may include determining whether it is likely that engine cooling will be faster when the cooling fan is spun in the first direction as compared to the second direction, or vice versa. It may be understood that such a likelihood may be indicated under conditions when the probability is not greater than the threshold that either push-cooling or pull-cooling will result in the fastest cooling (see step 1030). Accordingly, turning to FIG. 12, such additional steps are indicated at steps 1032 and 1034, as part of method 1000*a*. Specifically, if at 1030, the probability is not greater than the threshold, the method may proceed to 1032 and may include indicating whether it is likely that rotating the cooling fan in the first direction will result in faster engine system cooling as compared to rotating the cooling fan in the second direction, or vice versa. Similar to that described for step 1030, the indication at step 1032 may be based on one or more of whether the vehicle-off event comprises a vehicle-off event corresponding to a learned route, based on V2V/V2I2V communications via use of the methodology depicted at FIG. 9, based on vehicle parking conditions indicated, for example, via GPS, inertial sensors, ultrasonic sensors, onboard cameras, etc. In other words, there may not be enough confidence in one or more of the above approaches to commence engine cooling by rotating the cooling fan in one direction as compared to the other, but it may still be likely that the engine may be more rapidly cooled via rotating the engine in one direction as compared to the other.

Such an indication may be useful for the following reason, namely that if it is indicated at step 1032 that it is likely that rotating the cooling fan in the second direction will result in faster engine cooling than rotating the cooling fan in the first direction, then method 1100 may be conducted where the cooling fan is first rotated in the first direction and then the second direction, such that cooling fan rotation in the second direction may be maintained responsive to an indication (via method 1100) that rotating the cooling fan in the second direction results in fastest engine cooling. In other words, an extra switch in cooling fan rotation direction may be avoided. Compare the above example to a situation where it is not indicated as to which direction of cooling fan rotation is more likely to result in faster engine cooling. If the cooling fan is first rotated in the first direction, followed by the second direction, and it is indicated that faster engine cooling resulted from rotation of the cooling fan in the first direction, then the cooling fan rotation direction would have to be switched back to the first direction again to conduct the cooling, resulting in extra use of energy.

Accordingly, proceeding to 1034, the method may include scheduling the cooling fan to be rotated first in the direction that is not likely to result in the fastest rate of engine cooling, followed by the direction that is likely to result in the fastest rate of engine cooling. Such scheduling may comprise updating steps 1110 and 1120 at method 1100, to reflect which direction it is desired to rotate the cooling fan first and which direction it is desired to rotate the cooling fan in subsequently.

Thus, a method comprises cooling an engine system of a vehicle at a vehicle-off event via selecting whether to rotate a cooling fan in a first direction or a second direction based on an indication of whether an engine system temperature decay rate is faster under conditions where the cooling fan is rotated in the first direction as compared to the second direction, or vice versa, and conducting a diagnostic during or following the cooling.

In such a method, conducting the diagnostic in response to the cooling may include conducting the diagnostic in response to the engine system being cooled to within a threshold temperature of an ambient temperature.

In such a method, the vehicle may be participating in a car-sharing model. The vehicle may be capable of autonomous vehicle operation. The diagnostic may rely on low-noise, static engine system conditions.

In such a method, the indication may be based at least in part on learned information regarding the vehicle-off event.

In such a method, the indication may be based at least in part on one or more parking conditions at the vehicle-off event, the one or more parking conditions including a proximity to structures that impact which direction of cooling fan rotation will result in the faster engine system temperature decay rate, and/or whether the vehicle is parked at inclined angle with a front end of the vehicle positioned at a higher altitude than a rear end of the vehicle.

In such a method, the indication may be based at least in part on vehicle-to-vehicle communications at the vehicle-off event, where data pertaining to whether rotating the cooling fan in the first direction or the second direction will result in the faster engine system decay rate is acquired wirelessly from a crowd of vehicles within a predetermined distance of the vehicle.

In such a method, the indication may be based at least in part on a first engine coolant temperature decay rate and a second engine coolant temperature decay rate, the first and the second engine coolant temperature decay rate measured via rotating the cooling fan in the first direction for a predetermined duration and rotating the cooling fan in the second direction for the predetermined duration, respectively, at the vehicle-off event.

Another example of a method comprises rotating a cooling fan in a first direction during conditions when rotating the cooling fan in the first direction cools an engine at a faster rate than when rotating the cooling fan in a second direction, and rotating the cooling fan in the second direction during conditions when rotating the cooling fan in the second direction cools the engine at a faster rate than when rotating the cooling fan in the first direction.

In an example of the method, rotating the cooling fan in the first direction or the second direction may be based on whether a probability is greater than a threshold that the engine will be cooled faster via rotating the cooling fan in the first direction as compared to the second direction, or vice versa. In such a method, the method may further comprise when the probability is less than the threshold, rotating the cooling fan in one of the first direction or the second direction based on a measured first engine coolant temperature decay rate and a measured second engine coolant temperature decay rate, and wherein the first engine coolant temperature decay rate may be measured via rotating the cooling fan in the first direction for a predetermined duration and where the second engine coolant temperature decay rate may be measured via rotating the cooling fan in the second direction for the predetermined duration. In such a method, the probability may be based on one or more of learned information, one or more parking conditions indicated to impact whether engine cooling will be faster via rotating the cooling fan in the first direction as compared to the second direction, or vice versa, and/or vehicle-to-vehicle communications where data is acquired pertaining to whether engine cooling will be faster via rotating the cooling fan in the first direction as compared to the second direction, or vice versa.

In such a method, a speed of the cooling fan for rotating the cooling fan in either the first direction or the second direction may be variable as a function of one or more of engine temperature, a temperature of a fuel system of the vehicle, and/or a requested duration of time to cool the engine to within a threshold of an ambient temperature.

In such a method, rotating the cooling fan in the second direction may remove dust and debris from a radiator of the vehicle.

In such a method, the vehicle may comprise a vehicle enabled to operate autonomously, and, the vehicle may be participating in a car-sharing model.

Figure 12:
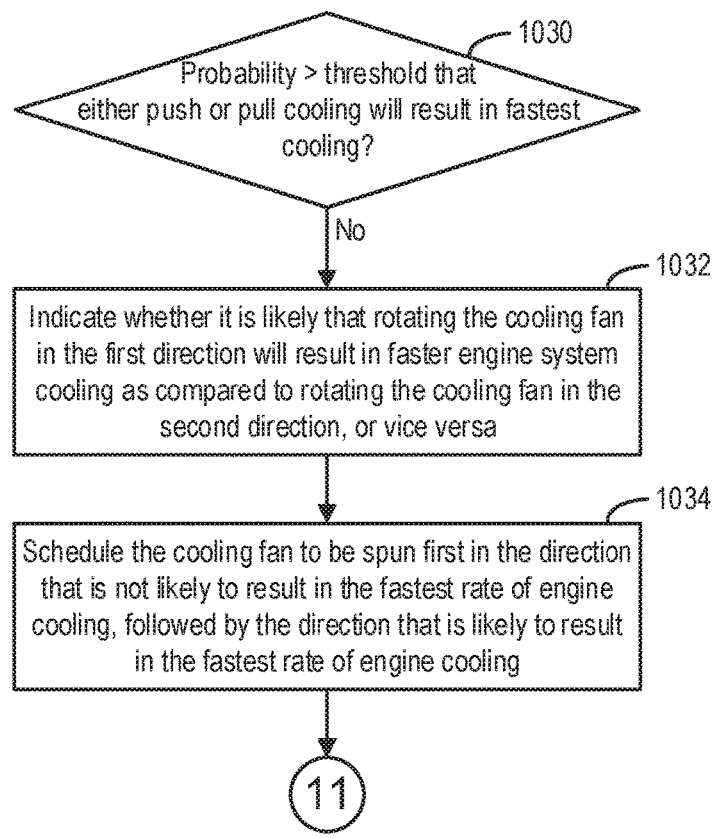
FIG. 12 depicts a high level flowchart that continues from FIG. 10 and illustrates additional steps between the method of FIG. 10 and the method of FIG. 11.
Figure 13:
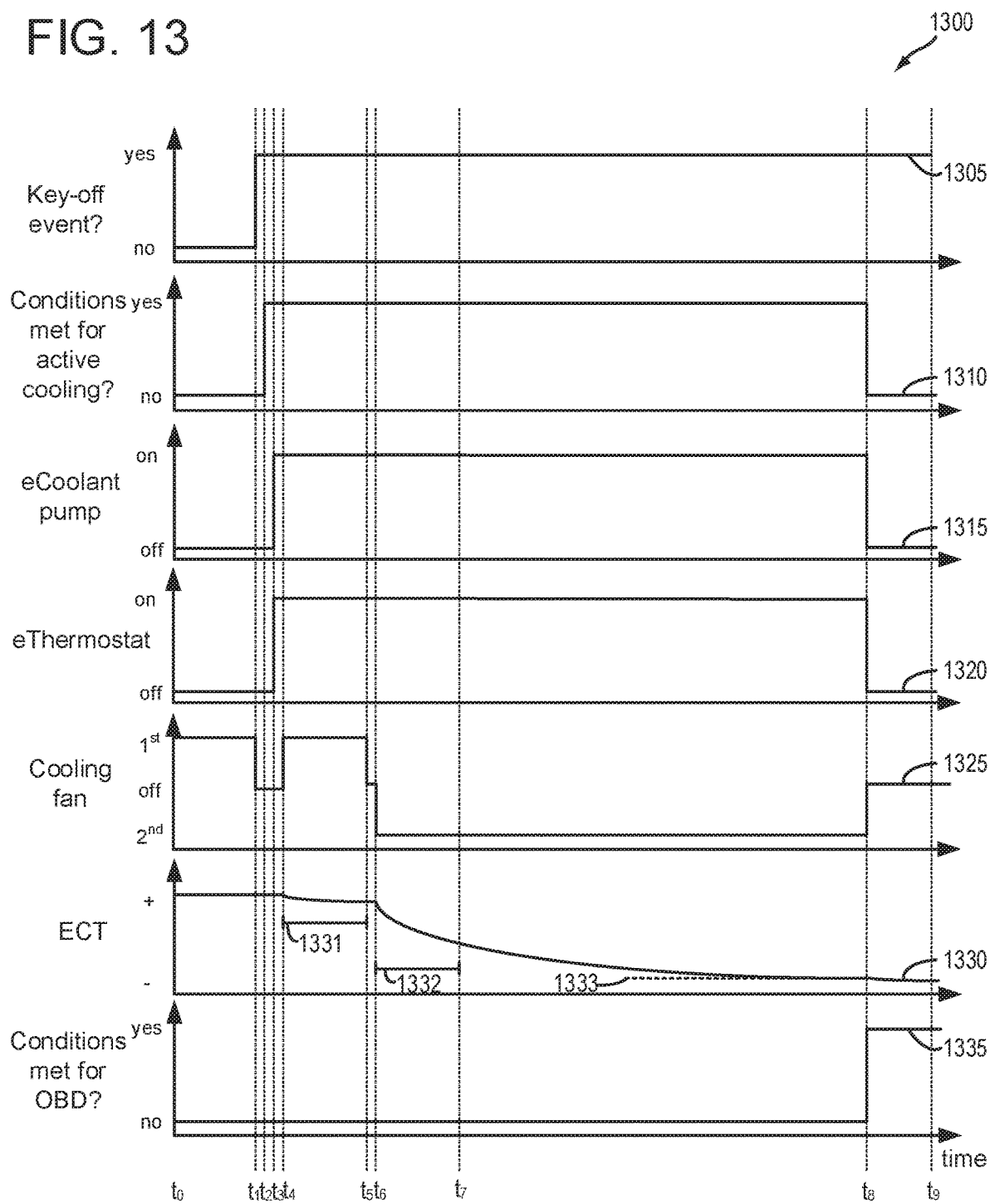
FIG. 13 depicts an example timeline for conducting an active engine system cooling operation according to the methods of FIGS. 10-12.

Turning now to FIG. 13, an example timeline 1300 for conducting the active engine system cooling operation as per the methods depicted at FIGS. 10-12, is shown. Timeline 1300 includes plot 1305, indicating whether a key-off (vehicle-off) event is indicated (yes or no), plot 1310, indicating whether conditions are met for active cooling of the engine system (yes or no), plot 1315, indicating status of an electric auxiliary coolant pump (e.g. 88) (eCoolant pump), and plot 1320, indicating status of the electronic thermostat (e.g. 38) (on or off), over time. Timeline 1300 further includes plot 1325, indicating operational status of the cooling fan (e.g. 92), over time. The cooling fan may be off, or rotating in the first direction or the second direction. Timeline 1300 further includes plot 1330, indicating engine coolant temperature (ECT), over time. Timeline 1300 further includes plot 1335, indicating whether conditions are met for conducting an onboard diagnostic (OBD) that relies on engine system static and low-noise conditions, over time.

At time t0, a key-off event is not indicated (plot 1305), and conditions are not met for active engine system cooling (plot 1310). The electronic auxiliary pump (e.g. 88) is off (plot 1315), the electronic thermostat is off (plot 1320) (thermostat valve closed), and the cooling fan is operating via rotating in the first direction (plot 1325). In other words, the vehicle is in operation at time t0. Engine coolant temperature is at a temperature consistent with engine operation (plot 1330), and conditions are not yet met for conducting an onboard diagnostic that relies on static, low-noise conditions (plot 1335).

At time t1, a key-off event is indicated (plot 1305), and the cooling fan is deactivated (plot 1325). At time t2, conditions are indicated to be met for active engine system cooling (plot 1310). Such conditions are described in detail above. Briefly, conditions being met may include a request to conduct a diagnostic that relies on static, low-noise conditions, but where the vehicle is participating in a car sharing model such that in order to achieve the static, low-noise conditions, the engine system relies on active cooling to be able to conduct the diagnostic within the time frame of the vehicle-off condition. While not explicitly illustrated, responsive to the indication that conditions are met for active cooling, it is indicated as to whether the probability is greater than the threshold that one of either pull cooling (operating the cooling fan in the first direction) or push cooling (operating the cooling fan in the second direction) is predicted to be more effective than the other, for rapidly and effectively cooling the engine system (refer to step 1030 of method 1000). In this example, it may be understood that the probability is not greater than the threshold, but that via method 1000a depicted at FIG. 12, it is indicated that it is likely that rotating the cooling fan in the second direction will result in the fastest rate of engine system cooling. Accordingly, method 1100 depicted at FIG. 11 is updated such that the cooling fan is rotated in the first direction and then the second direction, in order to determine which direction of rotation results in the fastest rate of engine system cooling. In this way, the diagnostic may be biased toward having the cooling fan rotating in the desired direction for engine cooling upon completion of the diagnostic to determine which direction results in the fastest rate of engine system cooling.

With conditions being met at time t2, at time t3, the auxiliary pump (e.g. 88) (plot 1315) is activated, and the electronic thermostat (e.g. 38) (plot 1320) is activated (thermostat valve open). At time t4, the cooling fan is activated to rotate in the first direction (plot 1325). With the cooling fan activated to rotate in the first direction, engine coolant temperature is monitored for a first duration comprising a duration between time t4 and t5, represented by line 1331. Via monitoring engine coolant temperature for the first duration, a first rate of engine coolant temperature decrease is recorded and stored at the controller.

At time t5, the cooling fan is deactivated, and at time t6, the cooling fan is reactivated to rotate in the second direction. It may be understood that a speed that the cooling fan is rotated at in the first direction may be the same speed as that of the speed cooling fan is rotated at in the second direction. The cooling fan is rotated in the second direction for a second duration comprising a duration between time t6 and t7, represented by line 1332. It may be understood that the duration represented by line 1331 may comprise a same duration as that represented by line 1332. With the cooling fan activated to rotate in the second direction, engine coolant temperature is monitored for the second duration. Via monitoring engine coolant temperature for the second duration, a second rate of engine coolant temperature decrease is recorded and stored at the controller.

At time t7, the first rate of engine coolant temperature decrease is compared to the second rate of engine coolant temperature decrease. In this example timeline, the rate of engine coolant temperature decrease is greater during the second duration than the first duration. In other words, engine cooling is more rapid and efficient when the cooling fan is rotated in the second direction as compared to when the cooling fan is operated in the first direction.

Accordingly, rather than having to switch cooling fan rotation again in order to cool the engine system to within the threshold of ambient temperature, the cooling fan is maintained rotating in the second direction between time t7 and t8. At time t8, engine coolant temperature becomes within the threshold of ambient temperature, represented by dashed line 1333. As the engine system has been effectively actively cooled, conditions are no longer met for active cooling of the engine system (plot 1310), and accordingly, the cooling fan is deactivated (plot 1325), the electronic thermostat is deactivated (plot 1320), and the auxiliary pump is deactivated (plot 1315). Furthermore, at time t8, conditions are indicated to be met for conducting the requested diagnostic that relies on the static, noise-free environment in order to conduct the diagnostic. While not explicitly illustrated, it may be understood that after time t8, with the vehicle still in a key-off condition, the particular diagnostic may be conducted.

In this way, for autonomous vehicles, or any other vehicles that operate in a car sharing model, the engine system may be rapidly cooled in order to conduct diagnostics that rely on static, noise-free conditions, without a long (e.g. 6-8 hour) soak time. By rapidly cooling the engine system, such diagnostics may be conducted before the vehicle is again operated, which may increase completion rates for said diagnostics and reduce issues related to degradation.

The technical effect is to recognize that engine system cooling may in some examples be faster when a cooling fan is operated in a first direction (pull-cooling), whereas in other examples engine system cooling may be faster when the cooling fan is operated in the second direction (push-cooling). Accordingly, a technical effect is to recognize that, in order to indicate which direction may be more effective for particular vehicle-off conditions, the cooling fan may be rotated first in one direction and then the other direction, to compare rates of engine system cooling under both conditions. Upon determining which direction of cooling fan rotation is most effective or efficient, then the cooling fan may continue to be operated in that direction to rapidly cool the engine system.

Another technical effect is to recognize that there may be opportunities to predict or learn whether particular vehicle-off events may be associated with more rapid engine system cooling via rotating the cooling fan in the first direction as compared to the second direction, or vice versa. Yet another technical effect is to recognize that under some circumstances, V2V/V2I2V communications technology may be utilized in order to indicate whether it is likely that operating the cooling fan in one direction may result in more rapid engine system cooling than operating the cooling fan in the other direction. Yet another technical effect is to recognize that onboard sensors such as GPS, ultrasonic sensors (e.g. parking sensors), etc., may be utilized to indicate whether particular vehicle-off conditions are such that it is likely that rotating the cooling fan in one direction may result in faster engine system cooling than rotation of the cooling fan in the opposite direction.

In another representation, a method comprises, during a first engine-off condition, rotating a cooling fan in a forward or first direction during or just prior to conducting a diagnostic test, during a second engine-off condition, rotating the cooling fan in a reverse or second direction during or just prior to conducting the diagnostic test, and during a third engine-off condition, rotating the cooling fan both in the forward and reverse direction during or just prior to conducting the diagnostic test.

As one example, the first engine-off condition may include an indication that a ground surface temperature is greater than a first threshold temperature, such that drawing air into the engine compartment may serve to rapidly cool the engine system. Ground surface temperature may be indicated, for example, via inferring ground surface makeup via onboard cameras configured to recognize and indicate whether the ground surface composition comprises asphalt vs. another surface such as concrete, dirt, grass, sand, etc., and/or via infrared cameras positioned such that an accurate estimation of ground temperature may be obtained. Ground surface makeup may be compared to ambient temperature in some examples, to infer the temperature of the ground surface based on inferred ground surface makeup and ambient temperature.

In another example, the second engine-off condition may include an indication that the ground surface temperature is less than a second threshold temperature, the second threshold temperature being below the first threshold temperature by a predetermined amount.

In another example, the third engine-off condition may include an indication that the ground surface temperature is greater than the second threshold temperature, but less than the first threshold temperature.

In another example, the first engine-off condition may include an indication that crowd data related to how to most effectively and rapidly cool the engine system indicates that rotating the cooling fan in the forward direction will most effectively and rapidly cool the engine system.

In another example, the second engine-off condition may include an indication that crowd data related to how to most effectively and rapidly cool the engine system indicates that rotating the cooling fan in the reverse direction will most effectively and rapidly cool the engine system.

In another example, the third engine-off condition may include an indication that crowd data related to how to most effectively and rapidly col the engine system is not conclusive (e.g. a confidence level is below a predetermined confidence level).

In another example, the first engine-off condition may include an indication that the vehicle is parked on an inclined surface, with a rear end of the vehicle raised as compared to a front end.

In another example, the second engine-off condition may include an indication that the vehicle is parked on an inclined surface, with the front end of the vehicle raised as compared to the rear end.

In another example, the third engine-off condition may include an indication that the vehicle is parked on a flat surface (not inclined).

In another example, the first engine-off condition may include an indication that the vehicle is parked with the rear end of the vehicle further within a parking structure than the front end, in other words, the front end is more exposed to ambient outside air than the rear end.

In another example, the second engine-off condition may include an indication that the vehicle is parked with the front end of the vehicle further within a parking structure than the rear end, in other words, the rear end is more exposed to ambient outside air than the front end.

In another example, both the first and second engine-off conditions may include indications that the vehicle is parked in a situation that comprises a learned parking event, where it is indicated with a probability greater than a threshold that rotating the cooling fan in the forward direction (for the first condition) or rotating the cooling fan in the reverse direction (for the second condition) will result in the fastest and most effective engine system cooling for the particular learned parking event, and the third engine-off condition may include an indication that the vehicle is parked in a situation that does not comprise a learned parking event and/or where the probability is less than the threshold.

In another example, the first engine-off condition includes rotating the cooling fan in the forward direction without first rotating the cooling fan in one or more other directions, where the second engine-off condition includes rotating the cooling fan in the reverse direction without first rotating the cooling fan in the one or more other directions.

The systems and methods discussed herein may enable one or more systems and one or more methods. In one example, a method comprises cooling an engine system of a vehicle at a vehicle-off event via selecting whether to rotate a cooling fan in a first direction or a second direction based on an indication of whether an engine system temperature decay rate is faster under conditions where the cooling fan is rotated in the first direction as compared to the second direction, or vice versa; and conducting a diagnostic during or following the cooling. In a first example of the method, the method further includes wherein conducting the diagnostic in response to the cooling includes conducting the diagnostic in response to the engine system being cooled to within a threshold temperature of an ambient temperature. A second example of the method optionally includes the first example, and further includes wherein the vehicle is participating in a car-sharing model. A third example of the method optionally includes any one or more or each of the first and second examples, and further includes wherein the vehicle is capable of autonomous vehicle operation. A fourth example of the method optionally includes any one or more or each of the first through third examples, and further includes wherein the diagnostic relies on low-noise, static engine system conditions. A fifth example of the method optionally includes any one or more or each of the first through fourth examples, and further includes wherein the indication is based at least in part on learned information regarding the vehicle-off event. A sixth example of the method optionally includes any one or more or each of the first through fifth examples, and further includes wherein the indication is based at least in part on one or more parking conditions at the vehicle-off event, the one or more parking conditions including a proximity to structures that impact which direction of cooling fan rotation will result in the faster engine system temperature decay rate, and/or whether the vehicle is parked at inclined angle with a front end of the vehicle positioned at a higher altitude than a rear end of the vehicle. A seventh example of the method optionally includes any one or more or each of the first through sixth examples, and further includes wherein the indication is based at least in part on vehicle-to-vehicle communications at the vehicle-off event, where data pertaining to whether rotating the cooling fan in the first direction or the second direction will result in the faster engine system decay rate is acquired wirelessly from a crowd of vehicles within a predetermined distance of the vehicle. An eighth example of the method optionally includes any one or more or each of the first through seventh examples, and further includes wherein the indication is based at least in part on a first engine coolant temperature decay rate and a second engine coolant temperature decay rate, the first and the second engine coolant temperature decay rate measured via rotating the cooling fan in the first direction for a predetermined duration and rotating the cooling fan in the second direction for the predetermined duration, respectively, at the vehicle-off event.

Another example of a vehicle cooling method comprises rotating a cooling fan in a first direction during conditions when rotating the cooling fan in the first direction cools an engine at a faster rate than when rotating the cooling fan in a second direction; and rotating the cooling fan in the second direction during conditions when rotating the cooling fan in the second direction cools the engine at a faster rate than when rotating the cooling fan in the first direction. In a first example of the method, the method further includes wherein rotating the cooling fan in the first direction or the second direction is based on whether a probability is greater than a threshold that the engine will be cooled faster via rotating the cooling fan in the first direction as compared to the second direction, or vice versa. A second example of the method optionally includes the first example, and further comprises when the probability is less than the threshold, rotating the cooling fan in one of the first direction or the second direction based on a measured first engine coolant temperature decay rate and a measured second engine coolant temperature decay rate; and wherein the first engine coolant temperature decay rate is measured via rotating the cooling fan in the first direction for a predetermined duration and where the second engine coolant temperature decay rate is measured via rotating the cooling fan in the second direction for the predetermined duration. A third example of the method optionally includes any one or more or each of the first and second examples, and further includes wherein the probability is based on one or more of learned information, one or more parking conditions indicated to impact whether engine cooling will be faster via rotating the cooling fan in the first direction as compared to the second direction, or vice versa, and/or vehicle-to-vehicle communications where data is acquired pertaining to whether engine cooling will be faster via rotating the cooling fan in the first direction as compared to the second direction, or vice versa. A fourth example of the method optionally includes any one or more or each of the first through third examples, and further includes wherein a speed of the cooling fan for rotating the cooling fan in either the first direction or the second direction is variable as a function of one or more of engine temperature, a temperature of a fuel system of the vehicle, and/or a requested duration of time to cool the engine to within a threshold of an ambient temperature. A fifth example of the method optionally includes any one or more or each of the first through fourth examples, and further includes wherein rotating the cooling fan in the second direction removes dust and debris from a radiator of the vehicle. A sixth example of the method optionally includes any one or more or each of the first through fifth examples, and further includes wherein the vehicle comprises a vehicle enabled to operate autonomously; and wherein the vehicle is participating in a car-sharing model.

An example of a system for a hybrid vehicle comprises an engine system; a cooling fan operable to be rotated in a first direction and a second direction; a cooling system including an electric coolant pump and an electric thermostat including a thermostat valve, and an engine coolant temperature sensor; and a controller with computer readable instructions stored on non-transitory memory that when executed, cause the controller to: at a vehicle-off event, command on the electric coolant pump, activate the electric thermostat to open the thermostat valve, and rotate the cooling fan in the first direction for a predetermined duration and record a first engine system temperature decay rate via the engine coolant temperature sensor, then rotate the cooling fan in the second direction for the predetermined duration and record a second engine system temperature decay rate; compare the first engine system temperature decay rate to the second engine system temperature decay rate; cool the engine system to within a threshold of an ambient temperature by rotating the cooling fan in a direction according to whether the first engine system temperature decay rate is faster than the second engine system temperature decay rate, or vice versa; and conduct a diagnostic that relies on engine system static and low-noise conditions responsive to the engine system being cooled to within the threshold of ambient temperature. In a first example of the system, the system further comprises an autonomous driving system; and wherein the controller stores further instructions to operate the vehicle via the autonomous driving system as part of a car-sharing model. A second example of the system optionally includes the first example, and further comprises a grill shutter system including grill shutters; and wherein the controller stores further instructions to command fully open the grill shutters for rotating the cooling fan in both the first direction and the second direction at the vehicle-off event. A third example of the system optionally includes any one or more or each of the first through second examples, and further comprises one or more solar cells, operative to convert solar radiation into electrical energy; and wherein the controller stores further instructions to operate the electric coolant pump, the electric thermostat, and the cooling fan via electrical energy supplied via the one or more solar cells.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. As used herein, "the term approximately is construed to mean plus or minus five percent of the range unless otherwise specified".

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
cooling an engine system of a vehicle at a vehicle-off event via selecting whether to rotate a cooling fan in a first direction or a second direction based on an indication of whether an engine system temperature decay rate is faster under conditions where the cooling fan is rotated in the first direction as compared to the second direction, or vice versa; and
conducting a diagnostic during or following the cooling, wherein the indication is based at least in part on a first engine coolant temperature decay rate and a second engine coolant temperature decay rate, the first and second engine coolant temperature decay rates measured via rotating the cooling fan in the first direction for a predetermined duration and rotating the cooling fan in the second direction for a predetermined duration, respectively, at the vehicle-off event.

2. The method of claim 1, wherein conducting the diagnostic in response to the cooling includes conducting the diagnostic in response to the engine system being cooled to within a threshold temperature of an ambient temperature.

3. The method of claim 1, wherein the vehicle is participating in a car-sharing model.

4. The method of claim 1, wherein the vehicle is capable of autonomous vehicle operation.

5. The method of claim 1, wherein the diagnostic relies on noise-free static engine system conditions.

6. The method of claim 1, wherein the indication is based at least in part on learned information regarding the vehicle-off event.

7. The method of claim 1, wherein the indication is based at least in part on one or more parking conditions at the vehicle-off event, the one or more parking conditions including a proximity to structures that impact which direction of cooling fan rotation will result in the faster engine system temperature decay rate, and/or whether the vehicle is parked at an inclined angle with a front end of the vehicle positioned at a higher altitude than a rear end of the vehicle.

8. The method of claim 1, wherein the indication is based at least in part on vehicle-to-vehicle communications at the vehicle-off event, where data pertaining to whether rotating the cooling fan in the first direction or the second direction will result in the faster engine system temperature decay rate is acquired wirelessly from a crowd of vehicles within a predetermined distance of the vehicle.

9. A vehicle cooling method, comprising:
rotating a cooling fan in a first direction during conditions when rotating the cooling fan in the first direction cools an engine at a faster rate than when rotating the cooling fan in a second direction; and
rotating the cooling fan in the second direction during conditions when rotating the cooling fan in the second direction cools the engine at a faster rate than when rotating the cooling fan in the first direction,
wherein rotating the cooling fan in the first direction or the second direction is based on whether a probability is greater than a threshold that the engine will be cooled faster via rotating the cooling fan in the first direction as compared to the second direction, or vice versa, and when the probability is less than the threshold, rotating the cooling fan in one of the first direction or the second direction based on a measured first engine coolant temperature decay rate and a measured second engine coolant temperature decay rate, and
wherein the first engine coolant temperature decay rate is measured via rotating the cooling fan in the first direction for a predetermined duration and where the second engine coolant temperature decay rate is measured via rotating the cooling fan in the second direction for a predetermined duration.

10. The method according to claim 9, wherein the probability is based on one or more of learned information, one or more parking conditions indicated to impact whether engine cooling will be faster via rotating the cooling fan in the first direction as compared to the second direction, or vice versa, and/or vehicle-to-vehicle communications where data is acquired pertaining to whether engine cooling will be faster via rotating the cooling fan in the first direction as compared to the second direction, or vice versa.

11. The method of claim 9, wherein a speed of the cooling fan for rotating the cooling fan in either the first direction or the second direction is variable as a function of one or more of engine temperature, a temperature of a fuel system of the vehicle, and/or a requested duration of time to cool the engine to within a threshold of an ambient temperature.

12. The method of claim 9, wherein rotating the cooling fan in the second direction removes dust and debris from a radiator of the vehicle.

13. The method of claim 9, wherein the vehicle comprises a vehicle enabled to operate autonomously; and
wherein the vehicle is participating in a car-sharing model.

14. A system for a hybrid vehicle, comprising:
an engine system;
a cooling fan operable to be rotated in a first direction and a second direction;
a cooling system including an electric coolant pump and an electric thermostat including a thermostat valve, and an engine coolant temperature sensor; and
a controller with computer readable instructions stored on non-transitory memory that, when executed, cause the controller to:
at a vehicle-off event, command on the electric coolant pump, activate the electric thermostat to open the thermostat valve, and rotate the cooling fan in the first direction for a predetermined duration and record a first engine system temperature decay rate via the engine coolant temperature sensor, then rotate the cooling fan in the second direction for a predetermined duration and record a second engine system temperature decay rate;
compare the first engine system temperature decay rate to the second engine system temperature decay rate;
cool the engine system to within a threshold of an ambient temperature by rotating the cooling fan in a direction according to whether the first engine system temperature decay rate is faster than the second engine system temperature decay rate, or vice versa; and
conduct a diagnostic that relies on noise-free engine system static conditions responsive to the engine system being cooled to within the threshold of ambient temperature.

15. The system of claim 14, further comprising:
an autonomous driving system; and
wherein the controller stores further instructions to operate the vehicle via the autonomous driving system as part of a car-sharing model.

16. The system of claim 14, further comprising:
a grill shutter system including grill shutters; and
wherein the controller stores further instructions to command fully open the grill shutters for rotating the cooling fan in both the first direction and the second direction at the vehicle-off event.

17. The system of claim 14, further comprising:

one or more solar cells, operative to convert solar radiation into electrical energy; and wherein the controller stores further instructions to operate the electric coolant pump, the electric thermostat, and the cooling fan via electrical energy supplied via the one or more solar cells.

\* \* \* \* \*